(12) United States Patent
Laisne et al.

(10) Patent No.: US 10,135,686 B2
(45) Date of Patent: Nov. 20, 2018

(54) COMMUNICATION INTERFACE

(71) Applicants: DIALOG SEMICONDUCTOR INC., Campbell, CA (US); Dialog Semiconductor (UK) Limited, London (GB)

(72) Inventors: Michael Laisne, Encinitas, CA (US); Mark Eason, Hollister, CA (US); Hans Martin von Staudt, Wellhelm (DE)

(73) Assignees: DIALOG SEMICONDUCTOR, INC., Campbell, CA (US); DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/405,151

(22) Filed: Jan. 12, 2017

(65) Prior Publication Data

US 2018/0198681 A1 Jul. 12, 2018

(51) Int. Cl.
*H04L 12/24* (2006.01)
*H04L 25/02* (2006.01)

(52) U.S. Cl.
CPC ........ *H04L 41/0866* (2013.01); *H04L 25/026* (2013.01)

(58) Field of Classification Search
CPC ............. H04L 25/4917; H04L 25/0264; H04L 41/0866; G06F 13/00; G06F 13/423
See application file for complete search history.

(56) References Cited

U.S. PATENT DOCUMENTS

| 5,872,468 | A | * | 2/1999 | Dyke | ...................... | H03K 5/082 |
| | | | | | | 327/333 |
| 7,053,667 | B1 | * | 5/2006 | Tang | ................... | H04L 25/0292 |
| | | | | | | 327/26 |
| 8,443,125 | B2 | | 4/2013 | Beccue | | |
| 2004/0039455 | A1 | * | 2/2004 | Donovan | .............. | G06F 9/3851 |
| | | | | | | 700/2 |
| 2008/0224765 | A1 | * | 9/2008 | Klein | ...................... | H03K 5/125 |
| | | | | | | 329/312 |
| 2009/0051675 | A1 | * | 2/2009 | Huang | ...................... | G06F 1/12 |
| | | | | | | 345/204 |

OTHER PUBLICATIONS

"High Precision Digitally Controlled Oscillator (DCXO)", SiT3907 datasheet, Si Time, Rev. 1.2, revised Jul. 24, 2014, www.sitime.com.
"Digitally Controlled Differential Oscillator (DCXO)", SiT3922 datasheet, Si Time, Rev. 1.1, revised Dec. 2, 2014, www.sitime.com.
Raja, Dilip, "Understanding 555 Timer IC (/article/555-time-ic)", Circuit Digest, retrieved Jan. 13, 2017, http://circuitdigest.com/article/555-timer-ic.

(Continued)

*Primary Examiner* — Vineeta S Panwalkar
(74) *Attorney, Agent, or Firm* — Haynes and Boone, LLP

(57) ABSTRACT

An interface for communicating between two device is provided that includes an interface input for receiving an input signal as well as a comparator circuit coupled to the interface input. The comparator circuit is adapted to provide a clock signal and a data signal based on the input signal to a first memory device having a first input for receiving the data signal and a second input for receiving the clock signal.

14 Claims, 26 Drawing Sheets

(56) References Cited

OTHER PUBLICATIONS

"Inside the 555 Timer", retrieved Jan. 13, 2017, http://www.555-timer-circuits.com/.
"555 Timer IC" Wikipedia, retrieved Jan. 13, 2017, https://en.wikipedia.org/wiki/555_timer_IC.
Heftman, Gene, "PWM: From a single Chip to a Giant Industry", Power Electronics, Oct. 1, 2005, retrieved Jan. 13, 2017, http://powerelectronics.com/power-management/pwm-sindle-chip-giant-industry.
Pincek, Dave, "Tri-Level Sync in a Bi-Level World", JW Sound Group, posted Jan. 25, 2013, retrieved Jan. 13, 2017, http://iwsoundgroup.net/index.php?/topic/15497-tri-level-sync-in-a-bi-level-world/.
The Valve Wizard, http://www.valvewizard.co.uk/uboat.html, Apr. 11, 2017.
"Echoes in Time: The history of Boss Delay Pedals", ROLAND, retrieved Jan. 13, 2017, https://www.roland.co.uk/blog/echoes-time-history-boss-delay-pedals/.

* cited by examiner

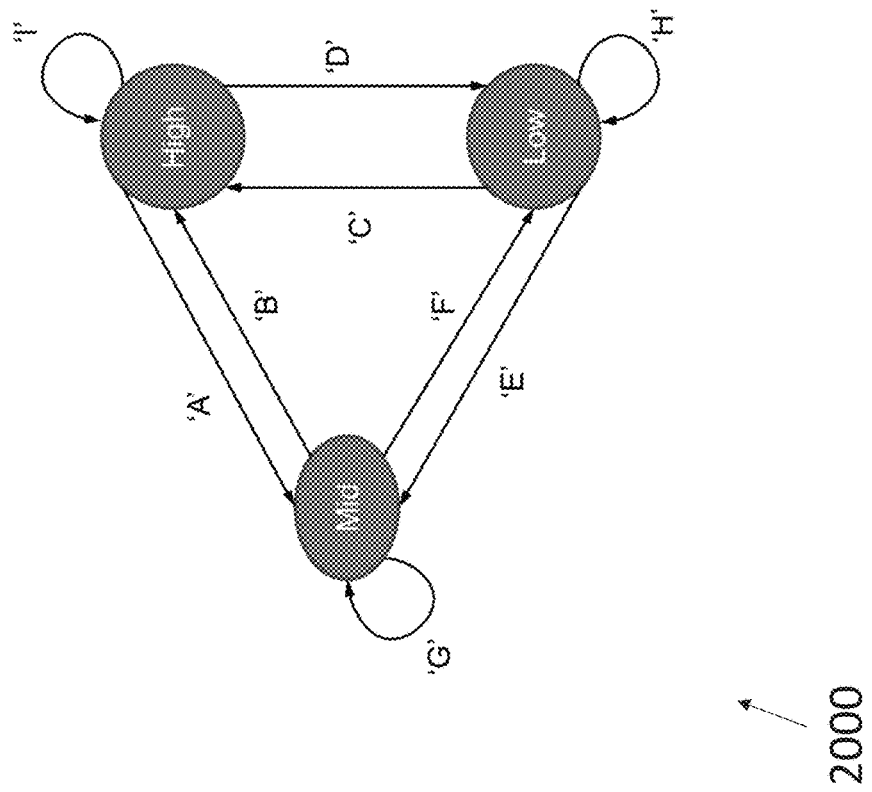
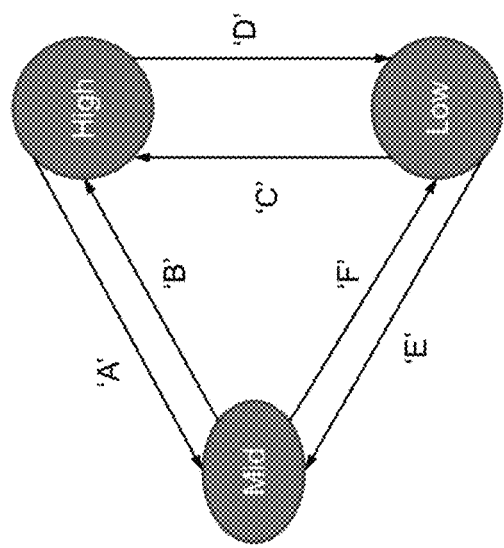
FIGURE 20

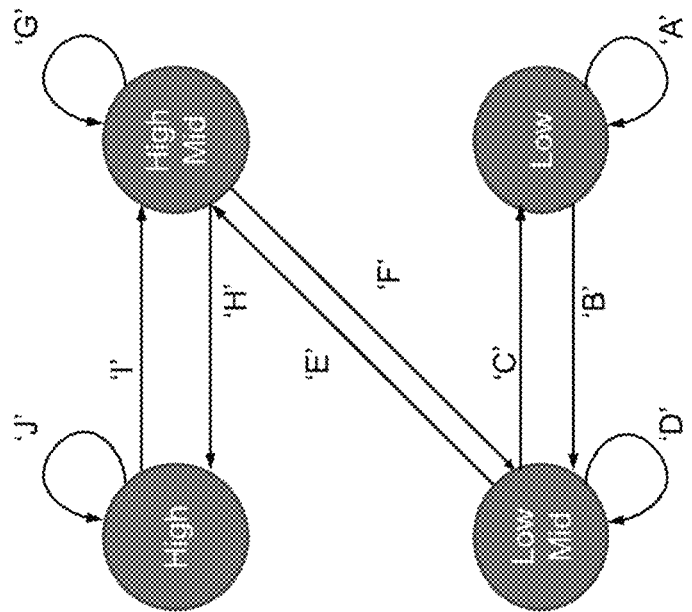
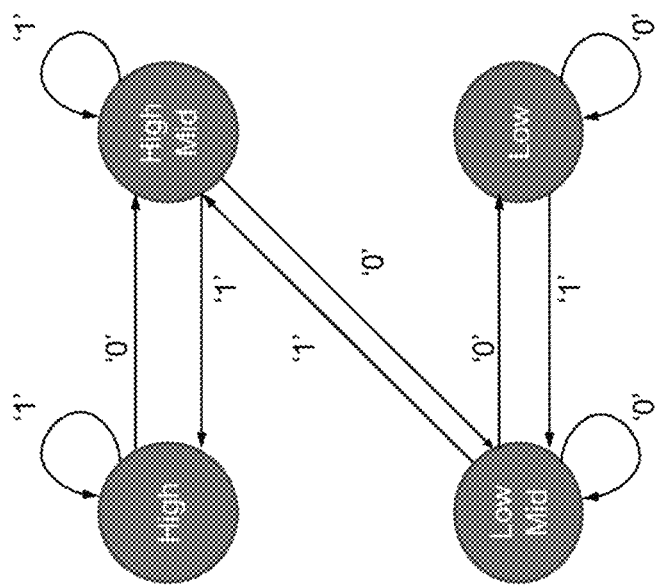
FIGURE 22

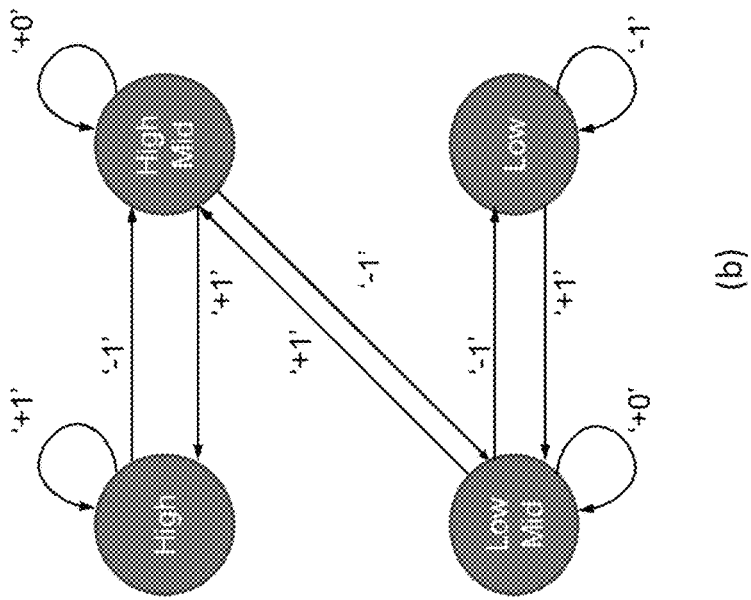
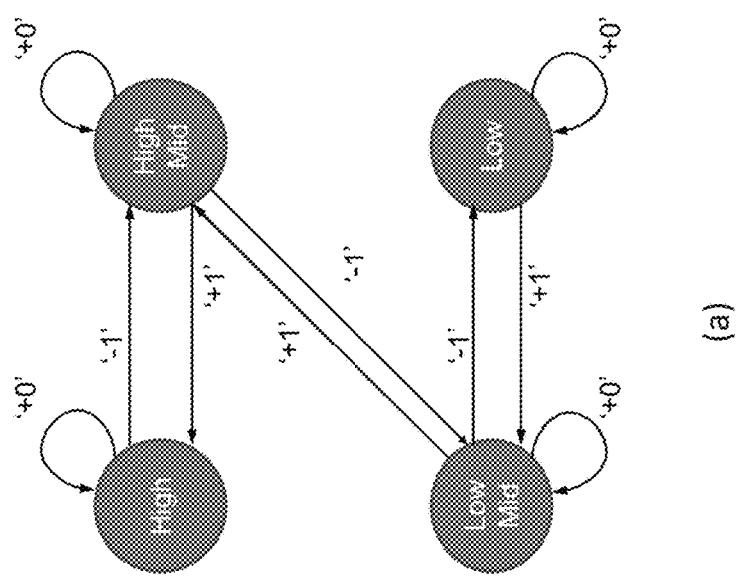
FIGURE 24

COMMUNICATION INTERFACE

FIELD OF THE DISCLOSURE

The present disclosure relates to an interface for communicating between two devices. In particular, the present application relates to a single wire interface.

BACKGROUND

Interfaces are used to get signals in and out of a circuit and allow a circuit to communicate with other circuits, either on a different device or in the same device. On low pin count devices, such as those typically used in analog applications, it is often necessary to minimize the number of input/output.

There are currently many serial wire solutions. There exist also numerous standards for serial interfaces including RS-232, RS-422, RS-485, I2C, SPI, Microwire, and 1-Wire. However existing solutions are either non-synchronous or require multiple pins, for example to obtain a clock signal that it external to the interface.

It is an object of the disclosure to address one or more of the above-mentioned limitations.

SUMMARY OF THE DISCLOSURE

According to a first aspect of the disclosure there is provided an interface for communicating between two devices, the interface comprising an interface input for receiving an input signal; a comparator circuit coupled to the interface input, the comparator circuit being adapted to provide a clock signal and a data signal based on the input signal; and a first memory device comprising a first input for receiving the data signal and a second input for receiving the clock signal and an output.

The proposed approach is synchronous and requires only a single wire or pin for signalling.

Optionally, the comparator circuit comprises a high-comparator and a low-comparator.

Optionally, the high-comparator may comprise a first high-comparator input coupled to the interface input and a second high-comparator input coupled to a first reference; and the second comparator may comprise a first low-comparator input coupled to the interface input and a second low-comparator input coupled to a second reference; and the first reference is greater than the second reference.

Optionally, the comparator circuit comprises a delay coupled to at least one of the high-comparator and the low-comparator.

Optionally, the comparator circuit comprises a detector circuit adapted to detect a symbol associated with the input signal.

Optionally, the interface comprises a second memory device. For example, the second memory device may be coupled to the detector circuit. Alternatively, the second memory device may be coupled to the comparator circuit.

Optionally, the detector circuit comprises a first latch for providing a first data signal and a second latch for providing a second data signal; wherein the first memory device is coupled to an output of the first latch and the second memory device is coupled to an output of the second latch.

Optionally, the symbol comprises at least one of a logic state, and an instruction state.

Optionally, the comparator circuit comprises N comparators, wherein each comparator is associated with a $N^{th}$ reference, wherein N is an integer greater than 2.

According to a second aspect of the disclosure there is provided a method of communicating an input signal between two devices comprising comparing the input signal with a first reference and providing a data signal based on the comparison with the first reference; comparing the input signal with a second reference and providing a clock signal based on the comparison with the second reference; and providing an output signal based on both the data signal and the clock signal.

This approach allows communicating a variety of symbols. For example, symbols associated with relatively complex waveforms.

Optionally, the input signal may be an analog signal and the output signal may be a digital signal.

Optionally, the input signal evolves between a plurality of states defined by the first reference and the second reference.

Optionally, the first reference is greater than the second reference.

Optionally, the method comprises detecting whether the input signal is in at least one of a plurality of states to identify a symbol associated with the signal.

Optionally, the method comprises determining a length of time the input signal remains in a given state.

Optionally, wherein the symbol comprises at least one of a logic state and an instruction state.

DETAILED DESCRIPTION

The invention is described in further detail below by way of example and with reference to the accompanying drawings, in which:

FIG. 20 is a state diagram of yet another three states system;

FIG. 22 is a state diagram of a four states system;

FIG. 24 is another diagram of a four states system;

Figure 1:
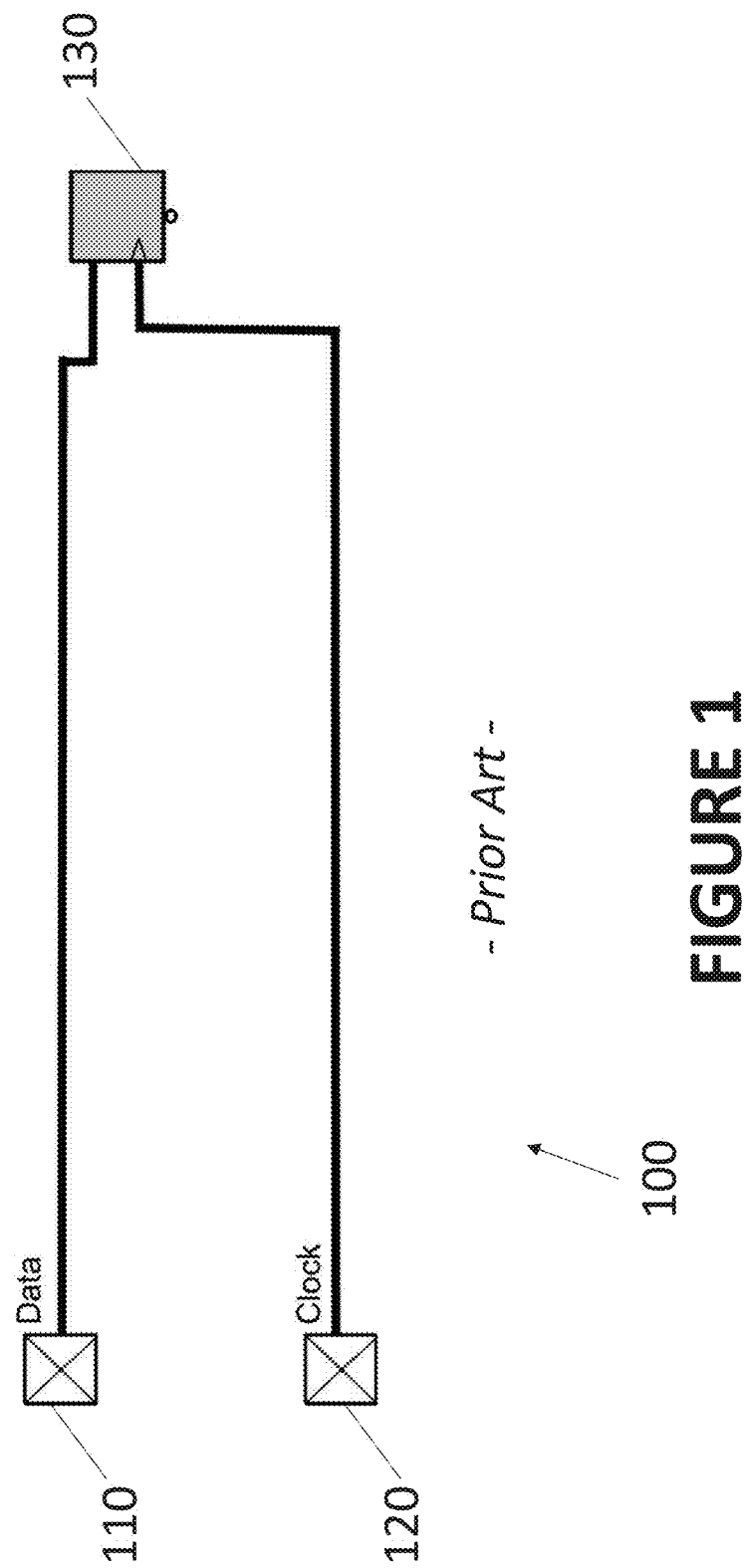
FIG. 1 is a diagram of an interface circuit according to the prior art.

FIG. 1 shows a diagram of an interface 100 according to the prior art. The interface includes two inputs connected to an edge triggered flip-flop 130. The first input 110 referred to as data terminal is connected to the data input of the edge triggered flip-flop 130. The second input 120 referred to as clock terminal is connected to the clock input of the edge triggered flip-flop 130.

Although more complicated low pin count interfaces exist, none of these interfaces are synchronous, with the timing controlled by the owner or master of the interface. Therefore, existing solutions are only synchronous with a clock signal that is external to the interface. In addition, existing interfaces can only communicate a limited number of symbols associated with an input waveform.

Figure 2:
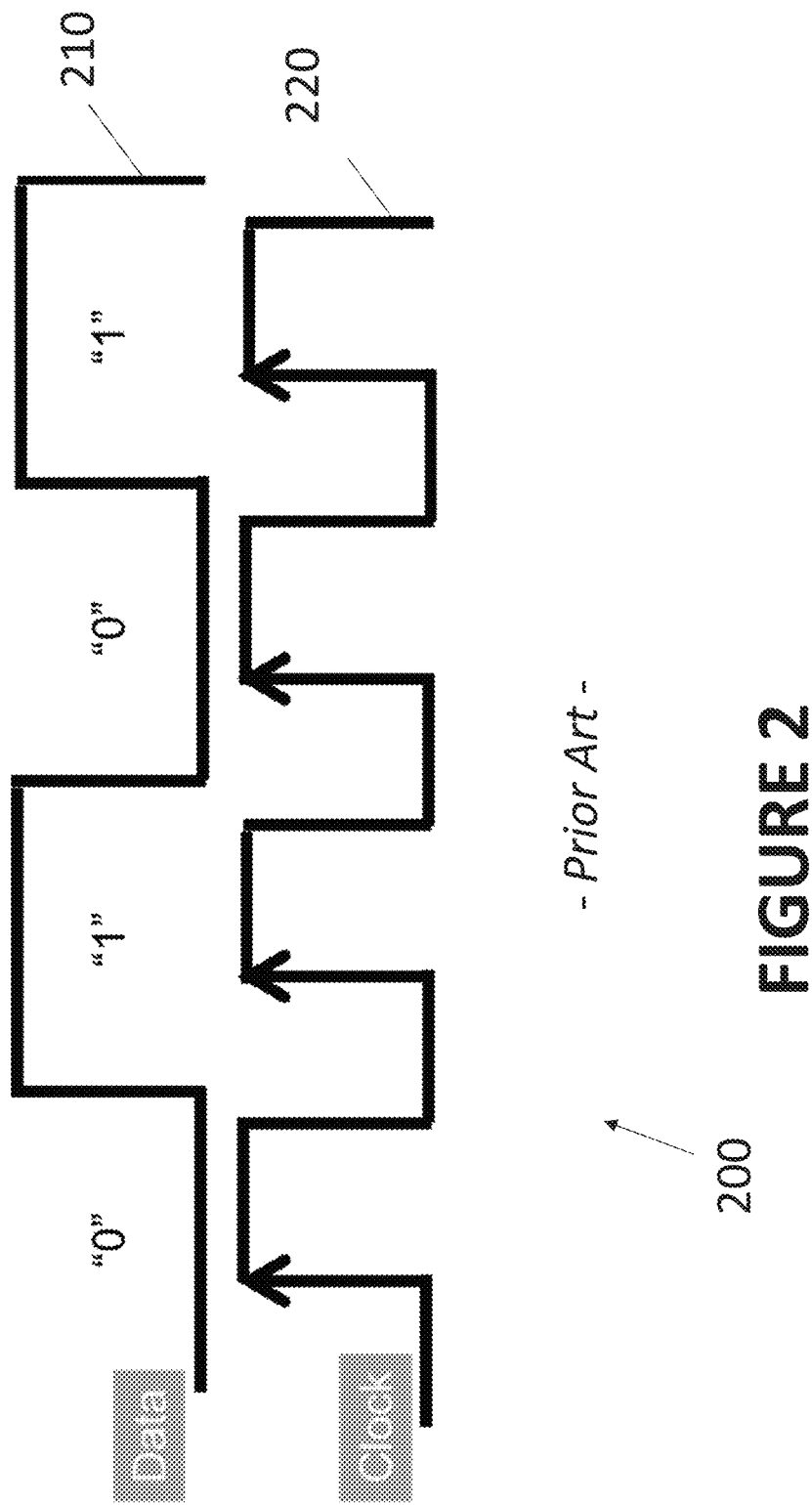
FIG. 2 is a timing chart illustrating the working of the interface circuit of FIG. 1.

FIG. 2 shows the waveforms of the data signal 210 provided at the data terminal 110 and the clock signal 220 provided at the clock terminal 120 of FIG. 1. The flip-flop captures the data on the rising edge of the clock signal.

An alternative circuit to the interface circuit of FIG. 1 may be obtained by providing an inverter between the clock terminal and the clock input of the flip flop. In this case, the flip-flop captures the data on the falling edge of the clock signal instead of the rising edge.

Figure 3:
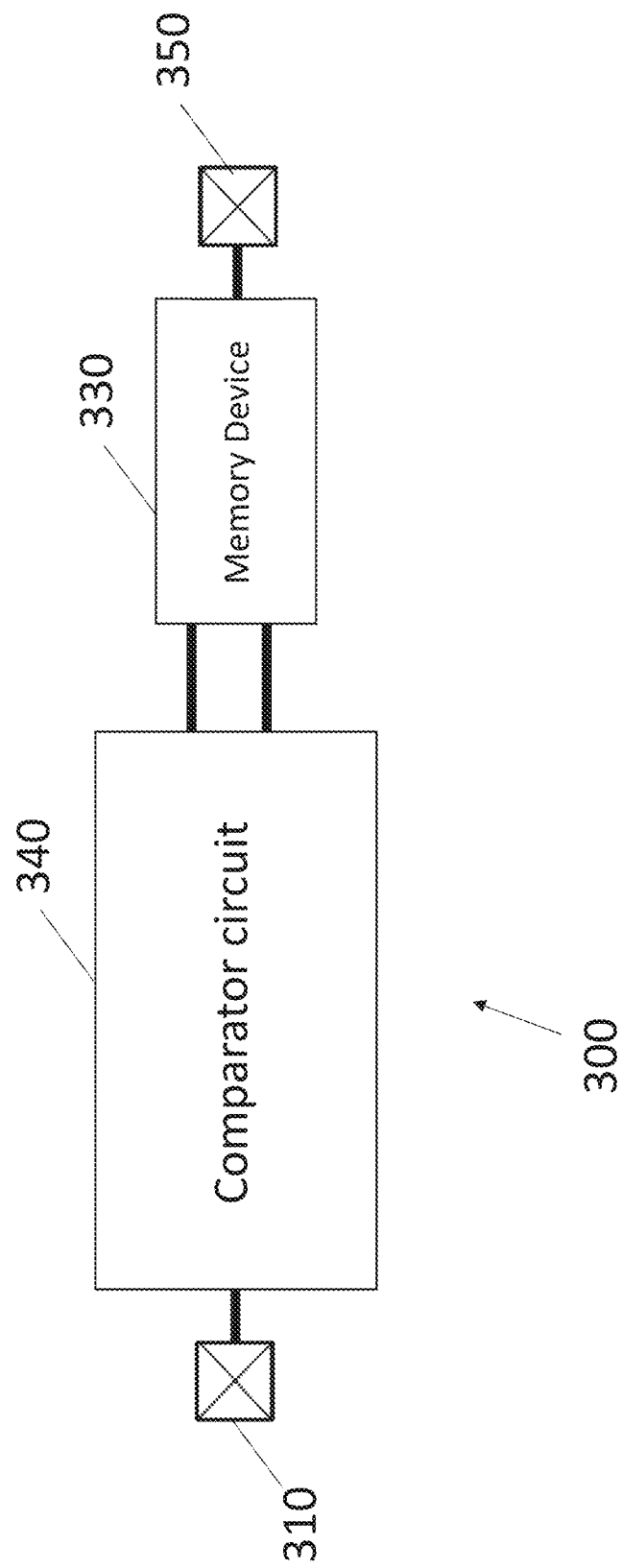
FIG. 3 is a diagram of an interface circuit according to the disclosure.

FIG. 3 illustrates a diagram of an interface circuit 300 according to the present disclosure. The interface extends between a first terminal 310 for example an input terminal also referred to as interface input and a second terminal 350 for example an output terminal also referred to as interface output. The interface includes a memory device 330 and a comparator circuit 340. The comparator circuit 340 has an input coupled to the interface input and two outputs for providing a clock signal and a data signal respectively. The memory device has a first input for receiving the data signal, a second input for receiving the clock signal and one output for providing information such as data or instructions. The interface 300 has a single input terminal and is referred to as a single wire interface.

Figure 4:
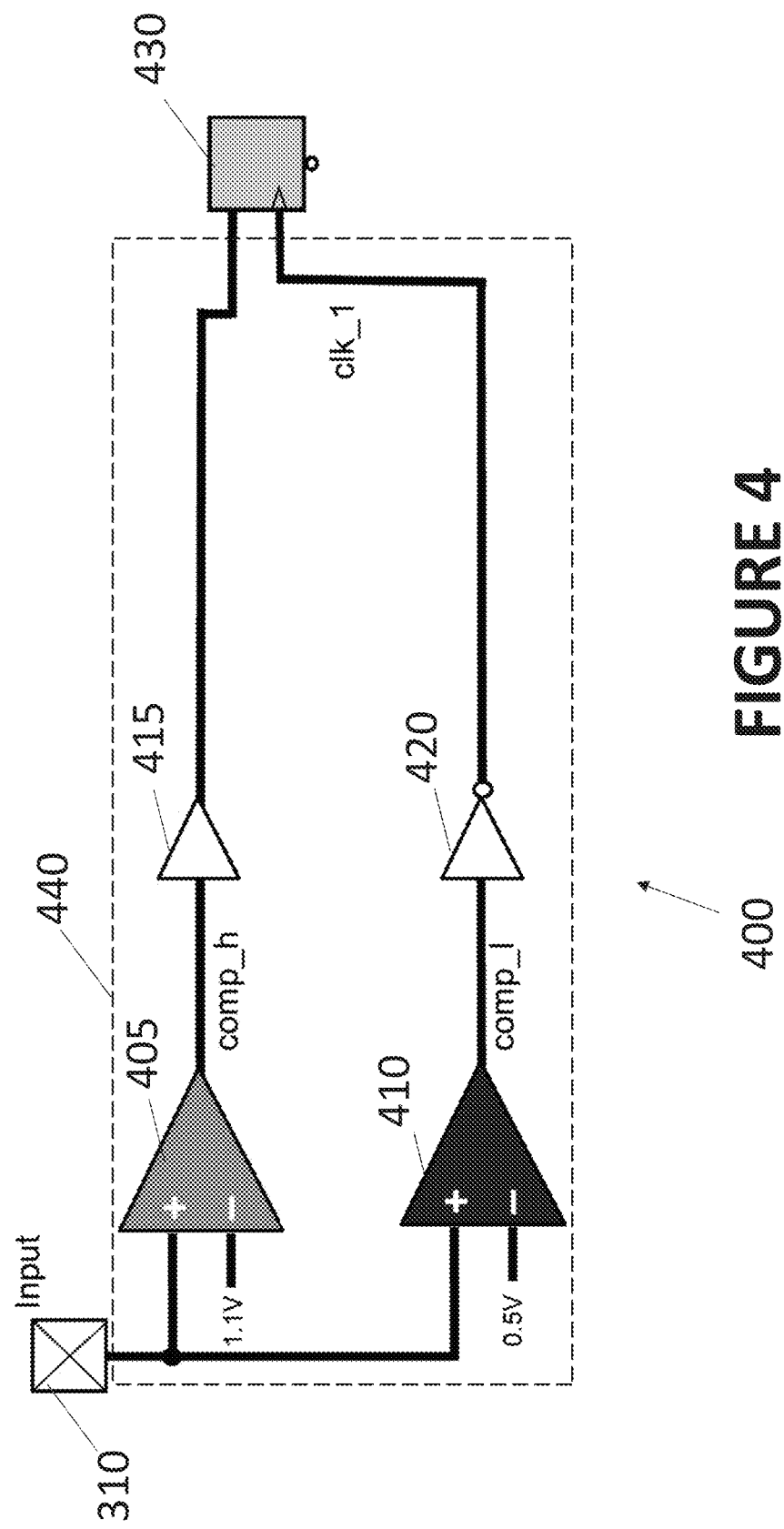
FIG. 4 is another diagram of an interface circuit according to the disclosure.

FIG. 4 shows an exemplary embodiment of the interface of FIG. 3. In this example the memory device 430 is provided by a data flip-flop also referred to as D flip-flop. The D flip-flop has a data input, a clock input, an output, and an optional reset input for receiving a reset signal. The comparator circuit 440 is formed by a first comparator 405 also referred to as high-comparator and a second comparator 410, also referred to as low-comparator.

The high-comparator 405 has a first input for example a non-inverting input coupled to the interface input 310 and a second input for example an inverting input coupled to a first reference for providing a first threshold value. The output of the comparator is coupled to a data input of the flip-flop 430 via a buffer 415. The buffer 415 slows down the output signal of the high comparator 405.

The low-comparator 410 has a first input for example a non-inverting input coupled to the interface input 310 and a second input, for example an inverting input, coupled to a second reference for providing a second threshold value. The output of the low-comparator 410 is coupled to a clock input of the flip-flop 430 via an inverter 420. The output of the inverter 420 is also referred to as the clock output as it provides the clock signal.

The first and second references may be provided by alternate power supplies. The first reference is greater than the second reference. For example, the first reference may be a first voltage threshold and the second reference may be a second voltage threshold in which the first voltage threshold is greater than the second voltage threshold. For instance, the first reference voltage may be 1.1V and the second reference voltage may be 0.5V.

Therefore, the high-comparator is tied to a high reference value, while the low-comparator is tied to a low reference value. This creates three recognizable states: a first state also referred to as low state, a second state also referred to as medium state, and a third state also referred to as high state. The low state may correspond to a region that is less than the than second reference of the low comparator, for example the low state may correspond to a region less than 0.5V. The medium state, may correspond to a region between the second reference of the low comparator and the first reference of the high-comparator, for example the medium state may correspond to a region between 0.5V and 1.1V. The high state may correspond to a region greater than the first reference of the high-comparator, for example the high state may correspond to a region greater than 1.1V.

The number of comparators may be increased in order to detect a larger number of states. For example, the interface may include N comparators to detect N+1 states. N is an integer, for example N may be greater than 2.

The part of the comparator circuit 440 including the high-comparator 405 and the buffer 415 form a first path, also referred to as data path. The part of the comparator circuit 440 including the low-comparator 410 and the inverter 420 form a second path, also referred to as clock path. The first path and the second path may have different signal propagation speed in order to facilitate proper timing conditions at the flip-flop. For example, the first path may be slower than the second path.

Figure 5:
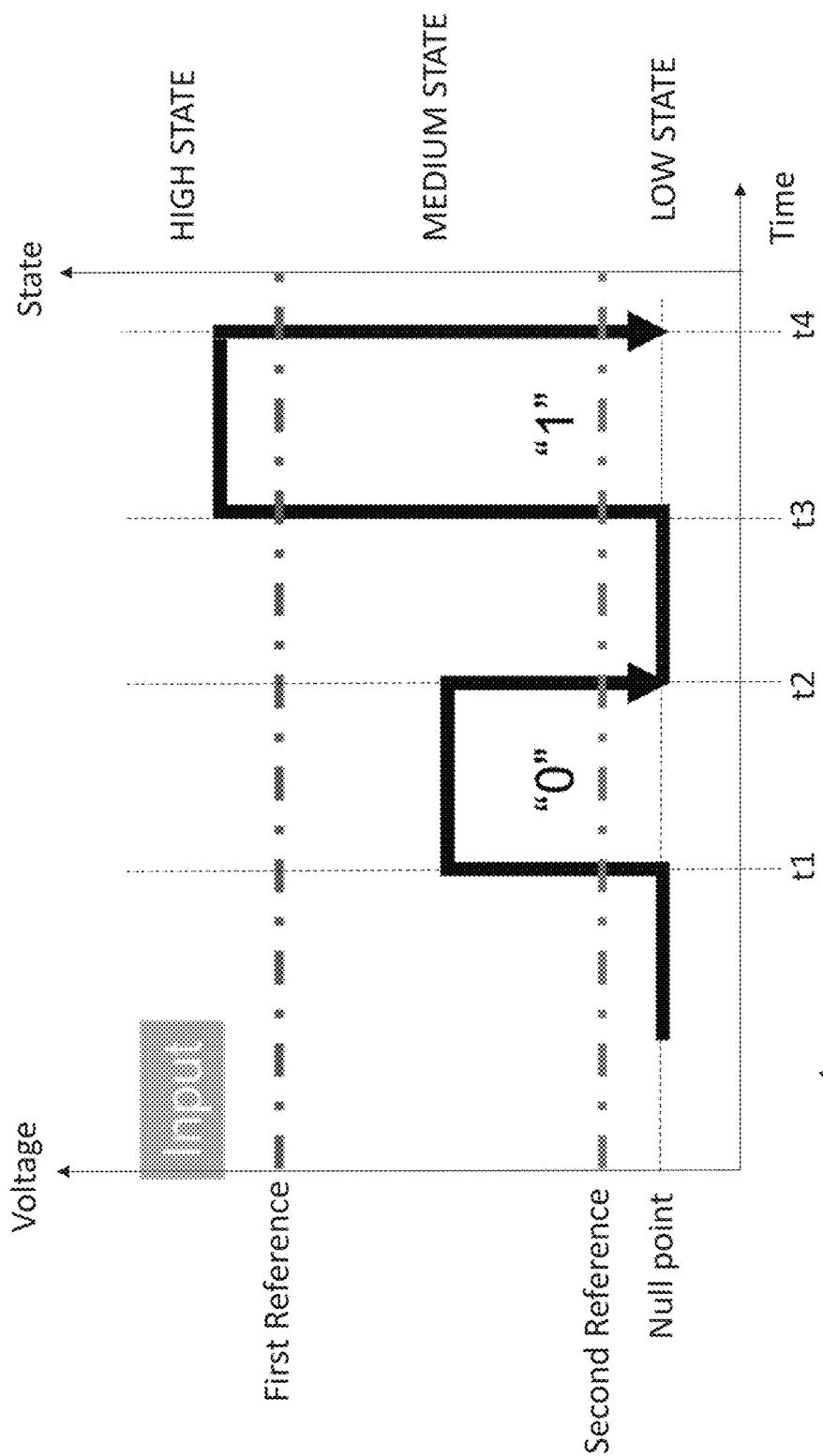
FIG. 5 is a timing chart illustrating the working of the interface circuit of FIG. 4.

FIG. 5 shows a timing chart illustrating the working of the interface circuit of FIG. 4. FIG. 5 shows input signal waveforms for a logic "0" and a logic "1" applied to the interface input of FIG. 4.

Before time t1, the input signal is at a first value referred to as null point. At time t1, the input signal switches from the LOW state to the MEDIUM state. This results in the flip-flop receiving a negative clock edge, which is ignored. At the same time a "0" remains at the data input of the flip-flop.

At time t2, the Input signal transitions from the MEDIUM state to the LOW state. This produces a positive edge at the clock input of the flip-flop, resulting in a "0" being stored in the flip-flop.

At time t3, the Input signal transitions from the LOW state to the HIGH state. This results in a "1" being placed at the data input of the flip-flop.

At time t4, the Input signal transitions from the HIGH state to the LOW state. Because the clock path is faster than the data path the clock edge reaches the flip-flop first before the data switches to "0", resulting in a "1" being stored in the flip-flop.

The D flip-flop changes output on the falling edge of the clock signal. However, the interface may be designed with a different null point. In addition, the flip-flop may change output on the rising edge of the clock signal.

The input waveform starts from a certain position referred to as null point.

In FIG. 5 the null point is less than the second reference. However, the null point may be selected such that it is located in the region of the least system activity for the signal being used. This helps ensure that communication over the signal is not part of normal analog operation. In other word the device is able to distinguish between a normal state of operation, normal mode, and a data transmission state of operation, transmission mode. For example, the normal state of operation may be 0V. By setting the null point to a value greater than the first reference, the device is able to distinguish between the normal mode and transmission mode.

Also, the naturally slower comparator among the first comparator and the second comparator may be chosen to carry the data.

Figure 6:
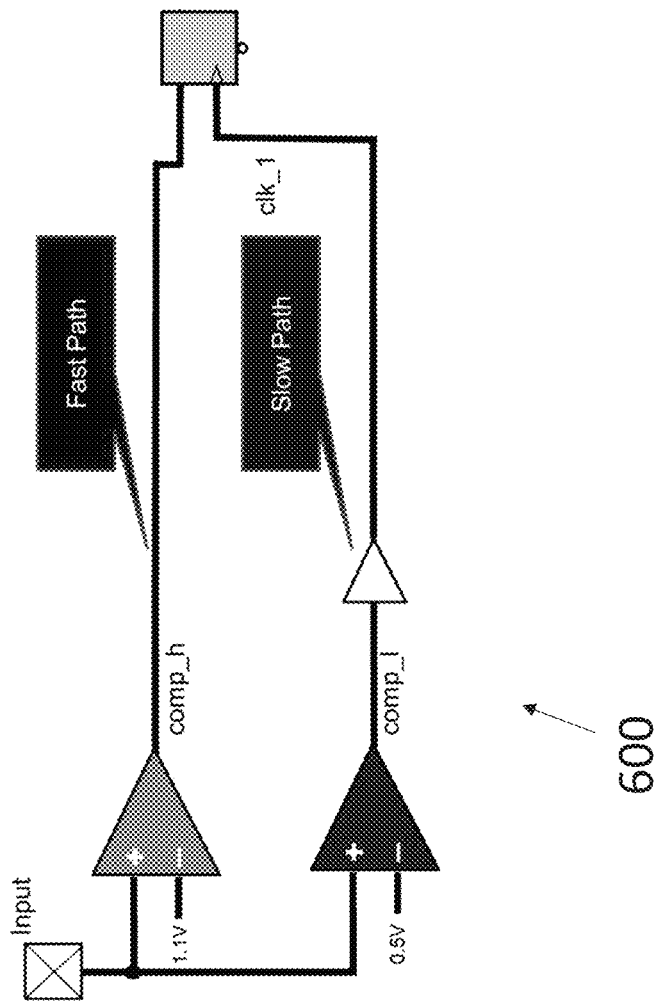
FIG. 6 is another diagram of an interface circuit according to the disclosure.

FIG. 6 illustrates another example embodiment of an interface circuit. In this case the high-comparator is directly coupled to the data input of the flip flop, and the low comparator is coupled to the clock input of the flip-flop via a buffer. The data path is faster than the clock path.

Figure 7:
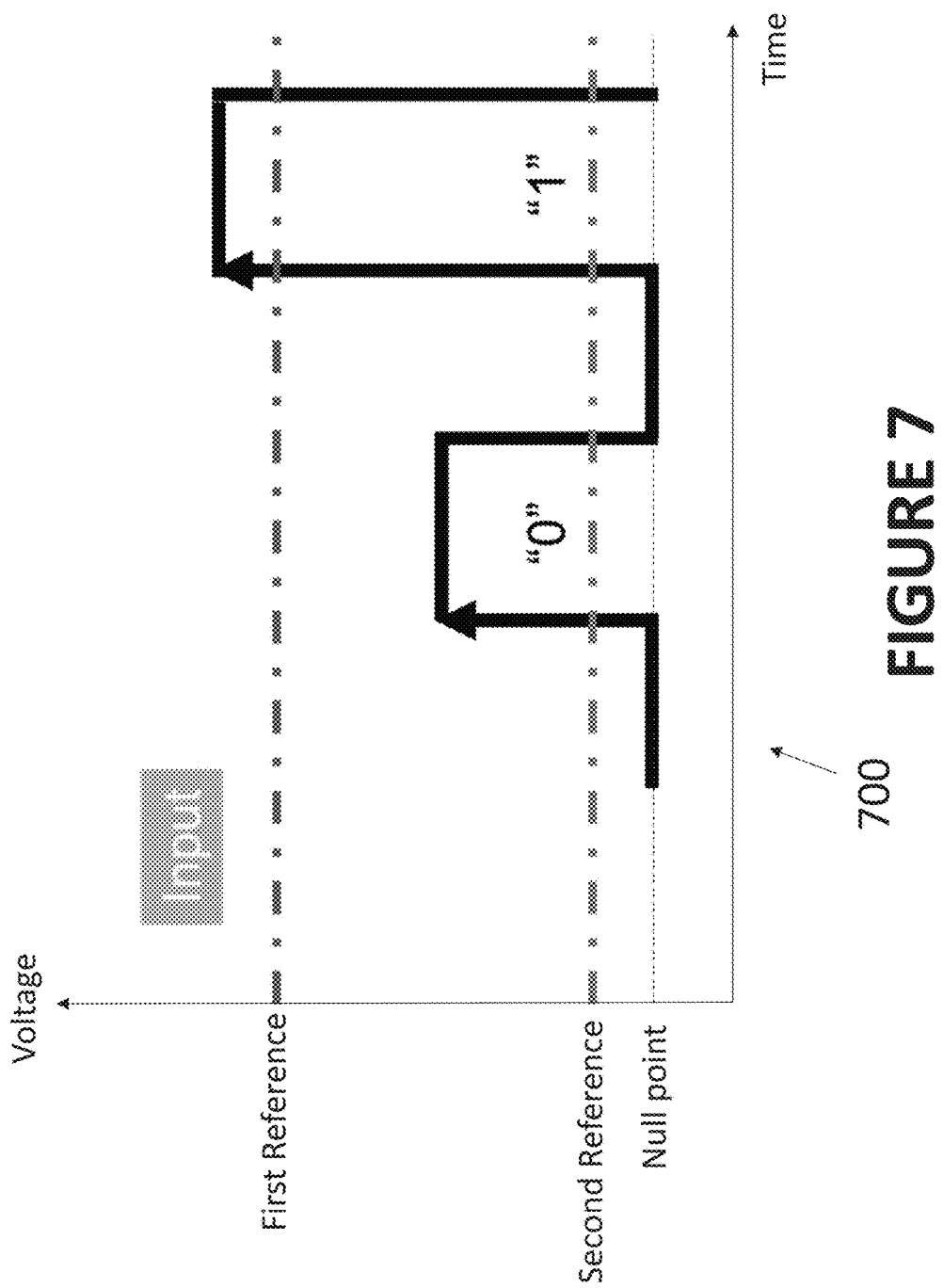
FIG. 7 is a timing chart illustrating the working of the interface circuit of FIG. 6.

FIG. 7 shows a timing chart illustrating the working of the interface circuit of FIG. 6. It can be observed that the null point is a null low. The flip-flop changes output on the rising edge of the clock signal.

Figure 8:
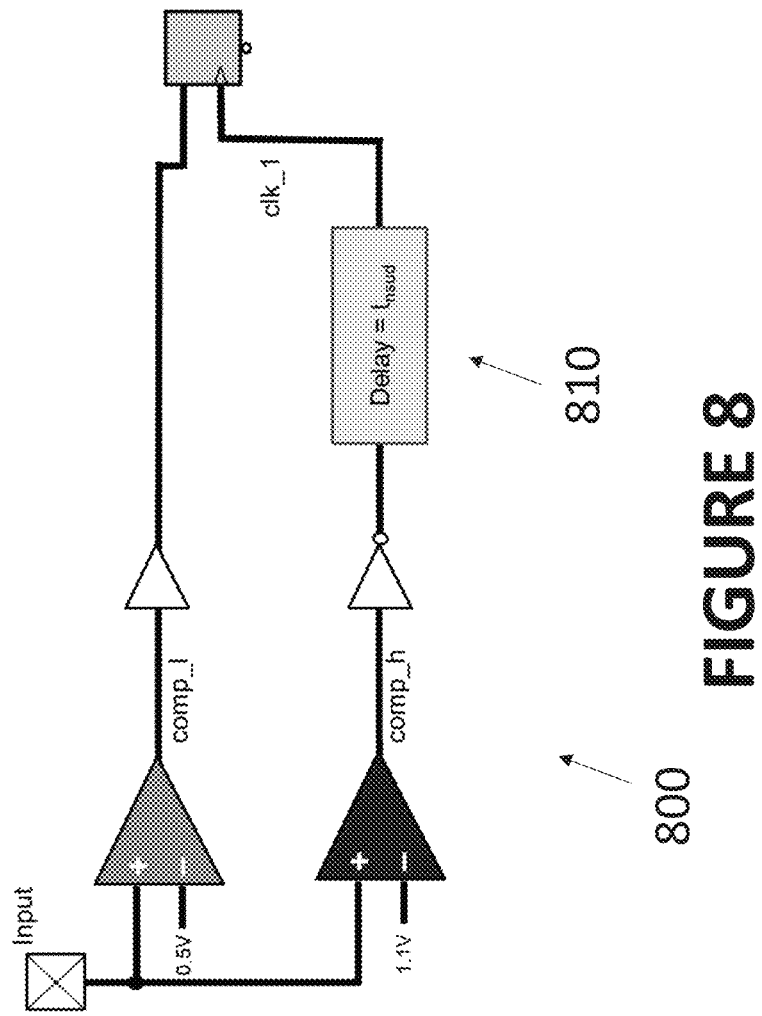
FIG. 8 is another diagram of an interface circuit according to the disclosure.

FIG. 8 illustrates another example embodiment of an interface circuit. In this case the high-comparator is coupled to the clock input of the flip flop via an inverter and a delay 810. The low comparator is coupled to the data input of the flip-flop via a buffer. The data path is faster than the clock path. The delay 810 may be set to provide a negative delay, for example by setting a negative edge setup delay parameter $t_{nsud}$. The additional $t_{nsud}$. The additional delay, 810, ensures that the clock will arrive after the data.

Figure 9:
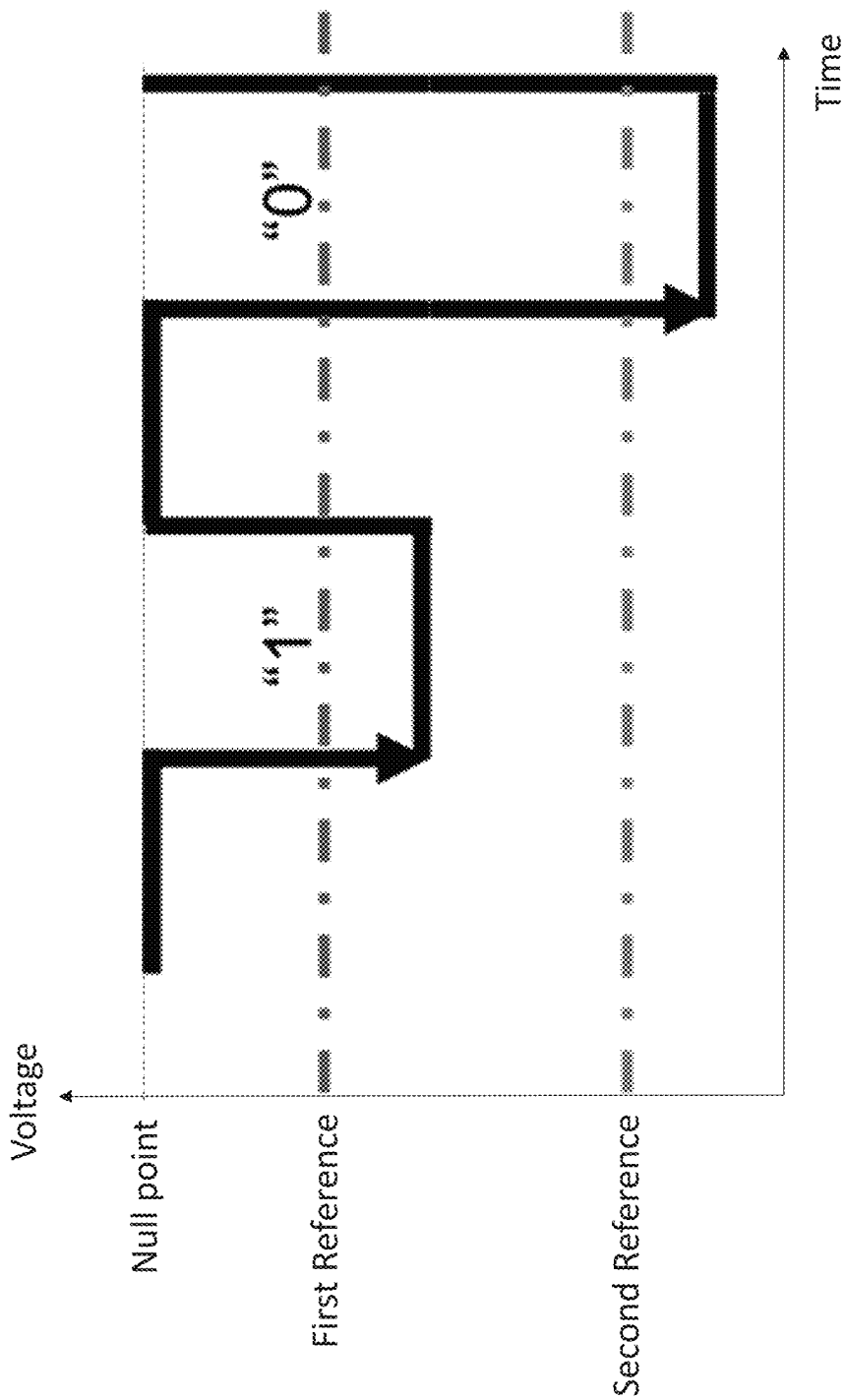
FIG. 9 is a timing chart illustrating the working of the interface circuit of FIG. 8.

FIG. 9 shows a timing chart illustrating the working of the interface circuit of FIG. 8. In this case the null point is greater than the first reference also referred to as null high. The flip-flop changes output on the falling edge of the clock signal.

Figure 10:
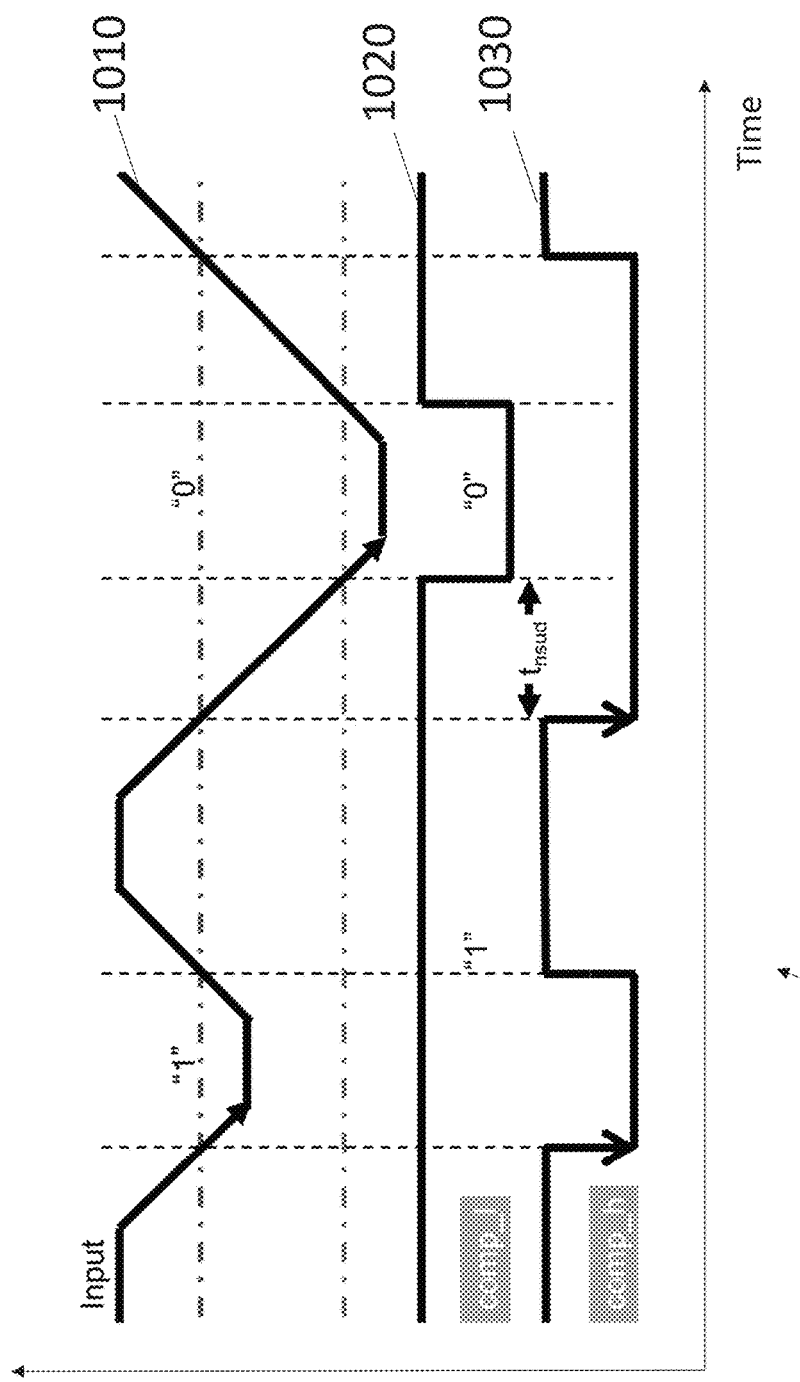
FIG. 10 is another timing chart illustrating the working of the interface circuit of FIG. 8.

FIG. 10 shows another timing chart illustrating the working of the interface circuit of FIG. 8. FIG. 10 shows the input waveform 1010, the data waveform 1020 and the clock waveform 1030.

The negative-edge setup delay parameter $t_{nsud}$ is set such that the high-comparator path is sufficiently long to enable the falling edge clock to capture the forthcoming data value.

Figure 11:
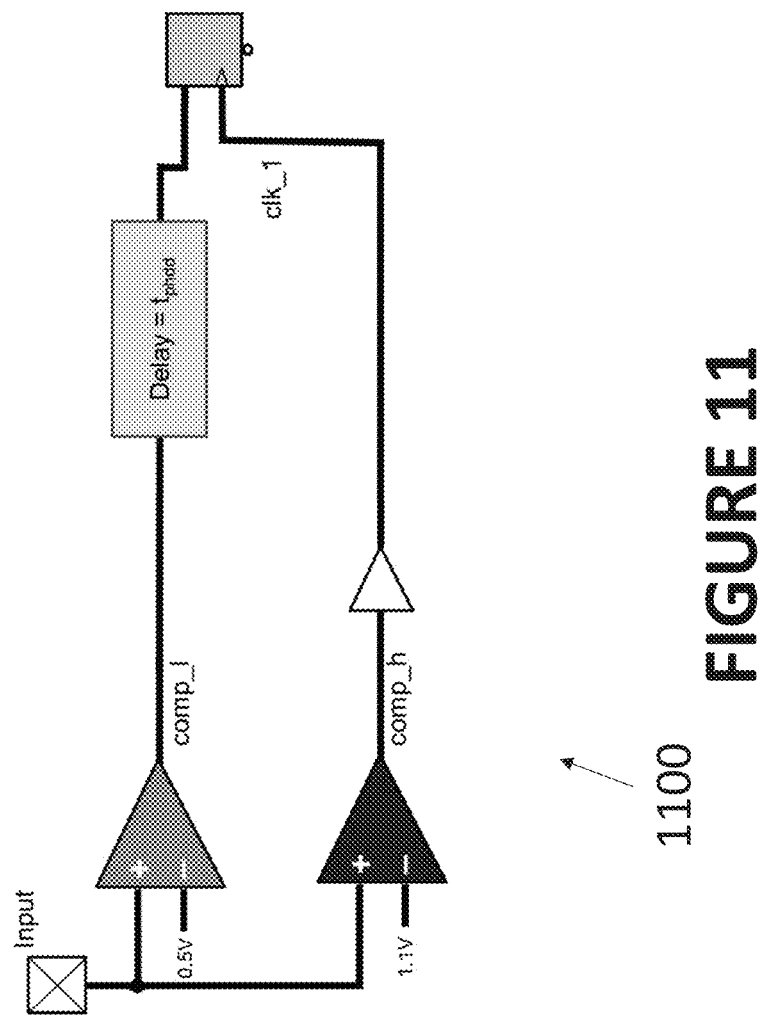
FIG. 11 is another diagram of an interface circuit according to the disclosure.
Figure 13:
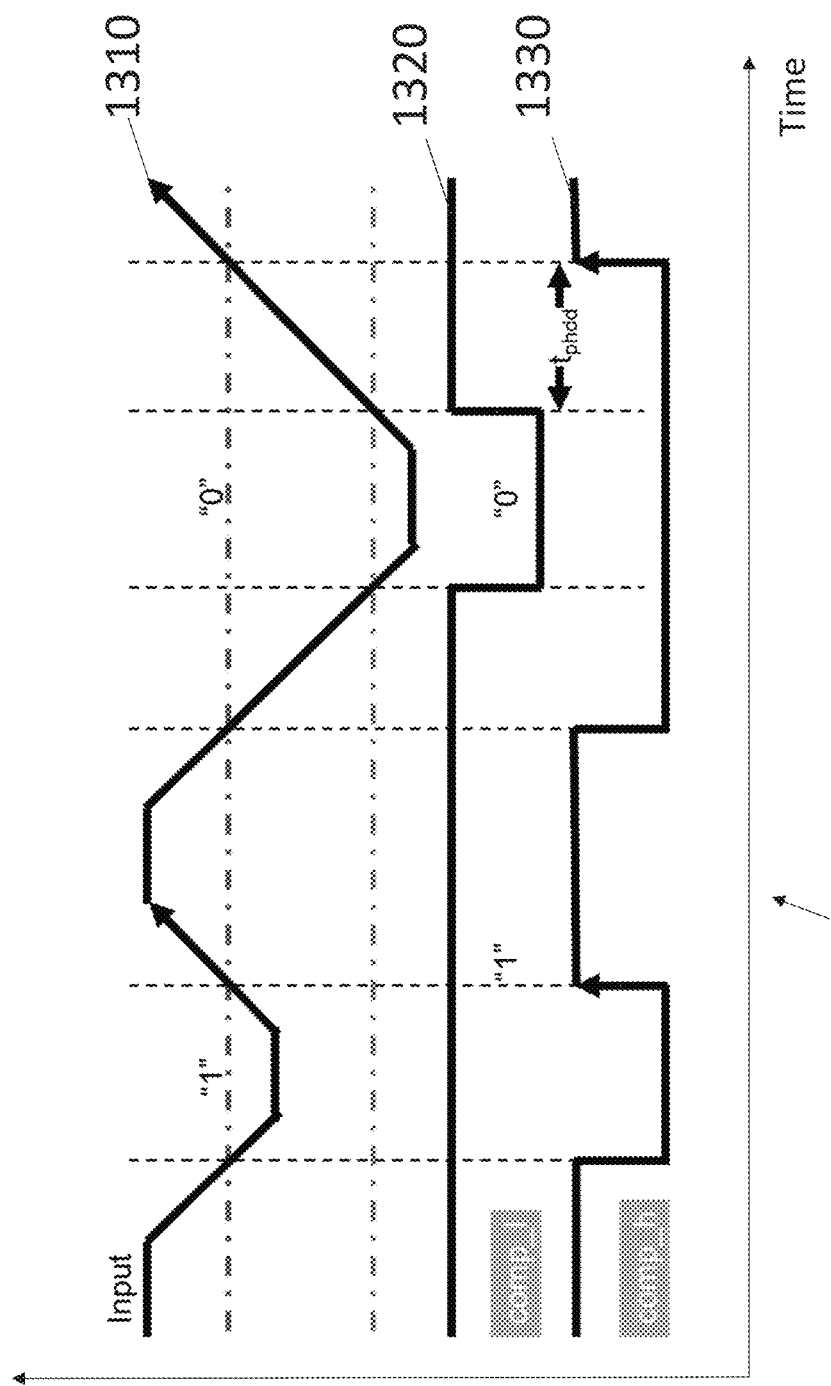
FIG. 13 is another timing chart illustrating the working of the interface circuit of FIG. 11.

FIG. 11 illustrates another example embodiment of an interface circuit. In this case the high-comparator is coupled to the clock input of the flip flop via a buffer. The low comparator is coupled to the data input of the flip-flop via a delay. As shown in FIG. 13, without this delay the data path would be slower than the clock path. Thus, the data would not be held long enough to be captured by the clock. Adding an additional delay of tphdd ensures that the data is captured. The delay may be set to provide a positive delay, for example for example by setting a positive-edge hold delay parameter $t_{phdd}$.

Figure 12:
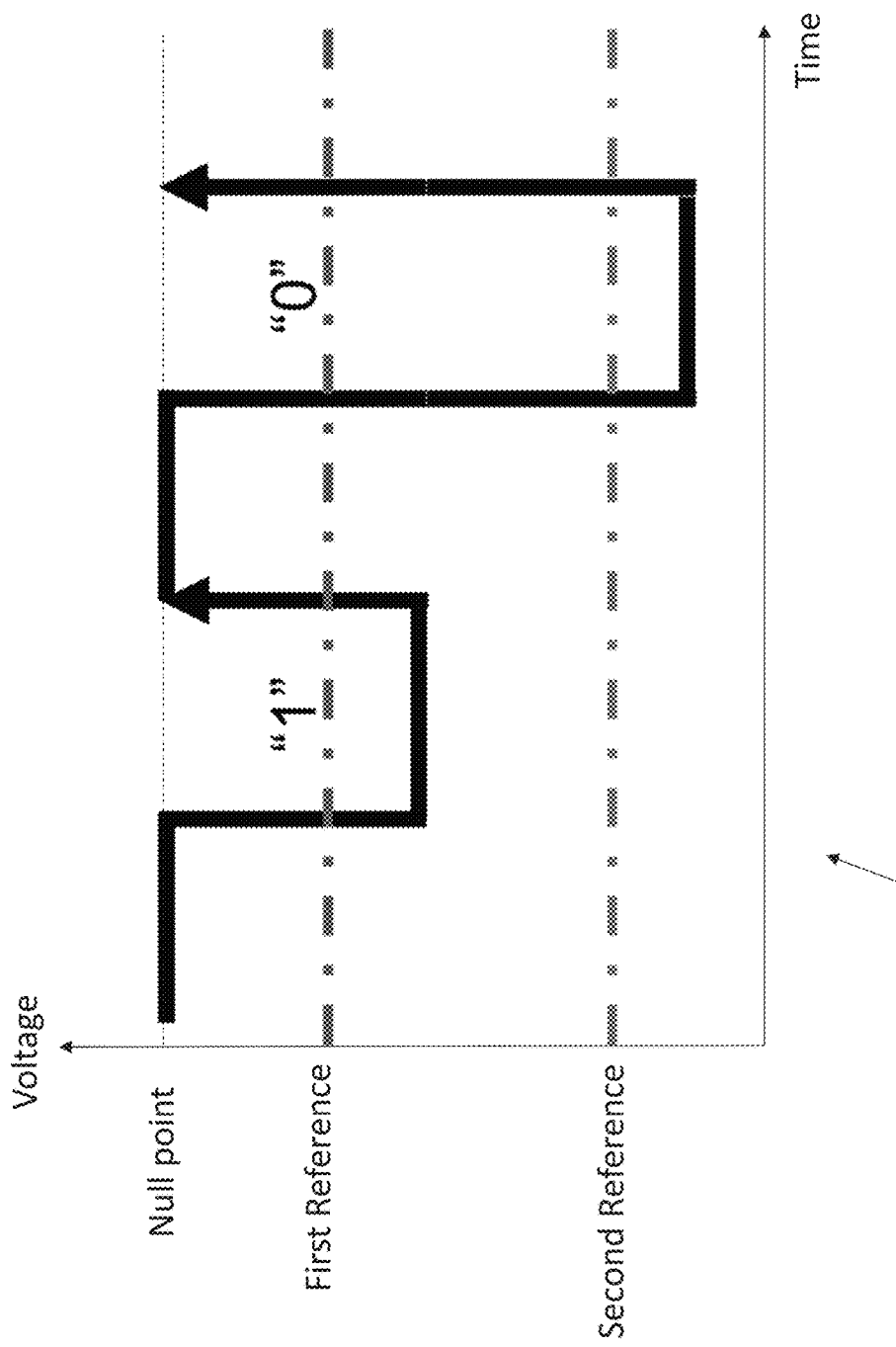
FIG. 12 is a timing chart illustrating the working of the interface circuit of FIG. 11.

FIG. 12 shows a timing chart illustrating the working of the interface circuit of FIG. 11. It can be observed that the null point is a null high. The flip-flop changes output on the rising edge of the clock signal.

FIG. 13 shows another timing chart illustrating the working of the interface circuit of FIG. 11. FIG. 13 shows the input waveform 1310, the data waveform 1320 and the clock waveform 1330.

The positive-edge hold delay parameter $t_{phdd}$, is set such that the low-comparator path is sufficiently long to enable the rising edge clock to capture the previous data value.

In yet another implementation the null point may be provided between the first reference and the second reference. The logic levels captured are arbitrary and can easily be changed with an inverter.

Different data or symbols may be obtained depending on the number of states and on a length of time the waveform remains in a given state. Data, such as a logic zero, a logic 1, and other information, such as instruction for instance a start bit or stop bit, can be represented using different waveforms.

Figure 14:
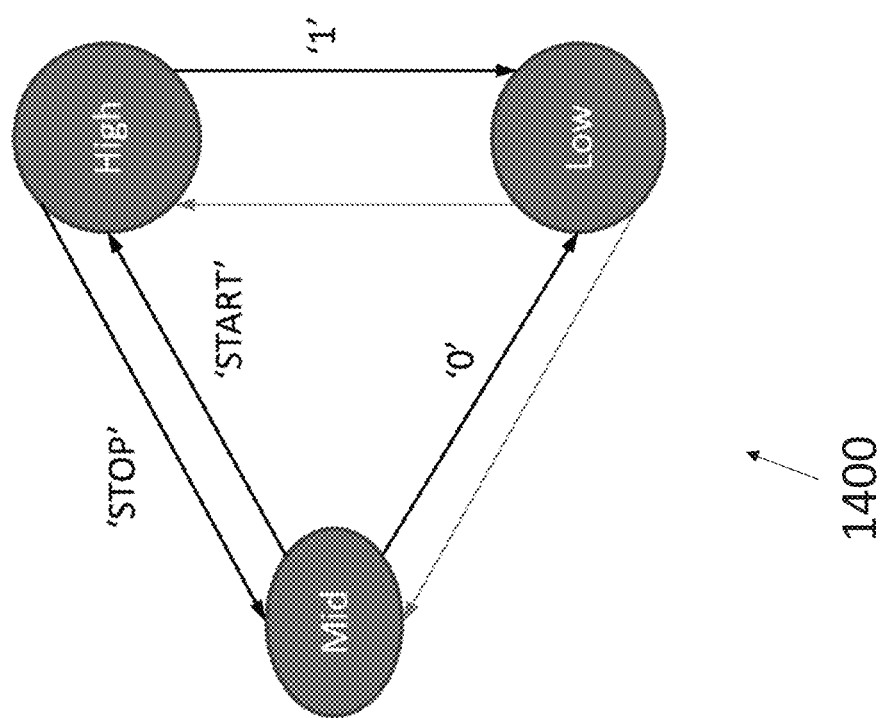
FIG. 14 is a state diagram of a three states system.

FIG. 14 shows a state diagram of a three states system. A transition between states may carry a symbol, such as a bit.

A symbol may be defined by an amplitude parameter and a time parameter.

The amplitude parameter may correspond to a state, for instance low, medium or high, in which the signal is located at a certain point in time. The time parameter may be a length time during which the signal remains in a same state.

In this example the low state is pivotal. It is a NULL state also referred to as vertex state. To provide data to the single tri-level signal, the apparatus must transition out of the NULL state. To generate new data the apparatus must return to this NULL or vertex state. In this configuration, a logic zero is generated by going from the Low state to the Medium state and then returning immediately to the Low state. A logic one is generated by going from the Low state immediately to the High state and then returning immediately to the Low state.

A 'START' symbol may be created by lingering, i.e staying for a certain amount of time, in the transitional state and only then moving to the High state, with the final transition back to NULL or vertex state, in this case the Low state.

Similarly, a STOP symbol may be created by lingering in the transitional state and only then moving to the High state, with the final transition back to NULL or vertex state, in this case the Low state.

FIG. 15(a) shows a waveform of a START symbol. The signal transitions from the LOW region, to the MEDIUM region, stays in the MEDIUM region for a certain time period, then transitions to the HIGH region, and, finally, transitions back to the LOW region.

FIG. 15(b) shows a waveform of a STOP symbol. The signal transitions from the LOW region, to the HIGH region, then back to the MEDIUM region, stays in the MEDIUM region for a minimum time period, then transitions to the LOW region.

Waveforms associated with a particular symbol can be generated by a circuit. Such a circuit also referred to as symbol generator circuit may be located outside the interface or integrated to the interface. For example, start and stop waveforms can be generated using a tristable buffer coupled to a pull-up resistor.

Figure 15:
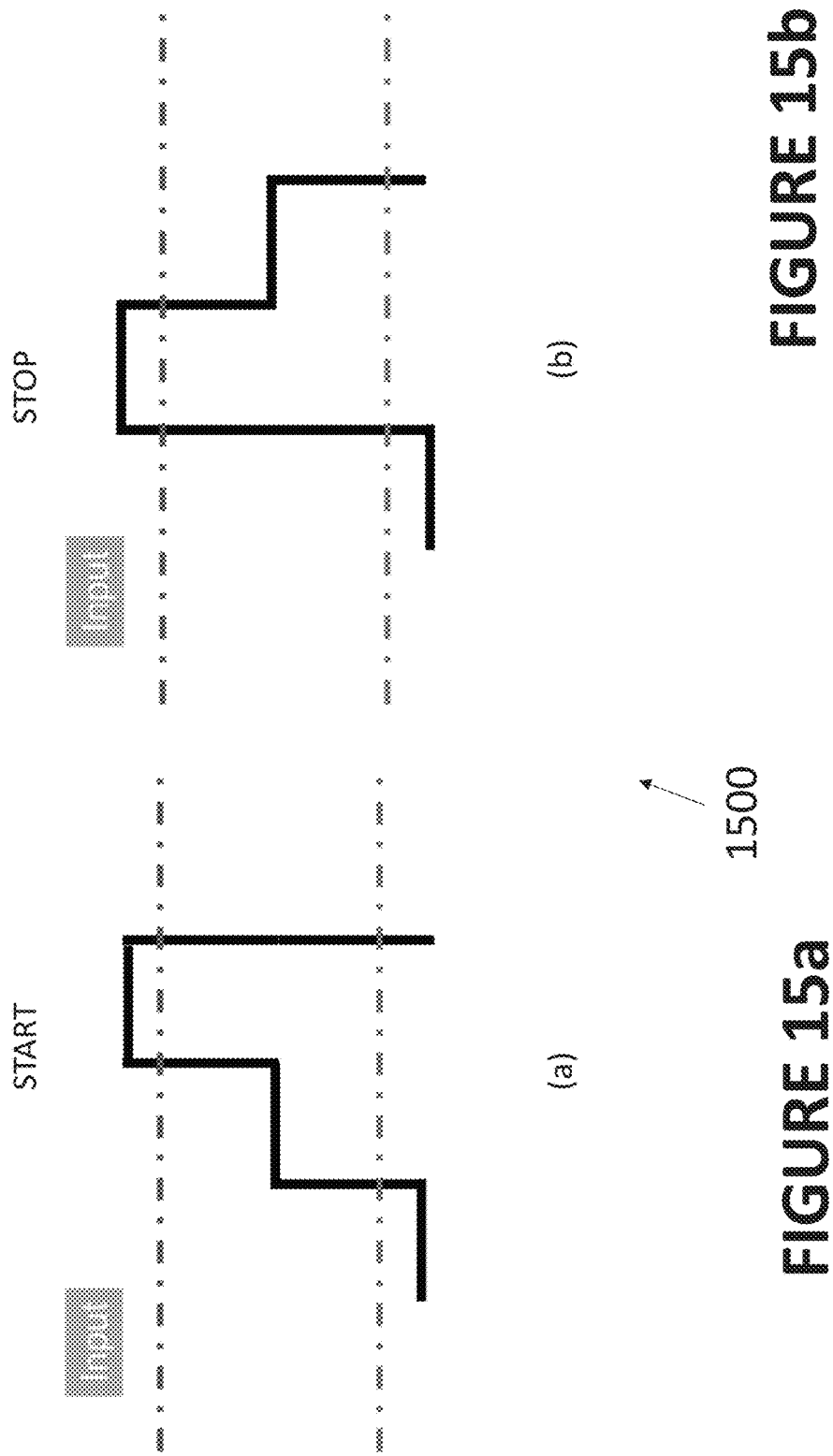
FIG. 15(a) is a waveform of a start symbol.
FIG. 15(b) is a waveform of a stop symbol.
Figure 16:
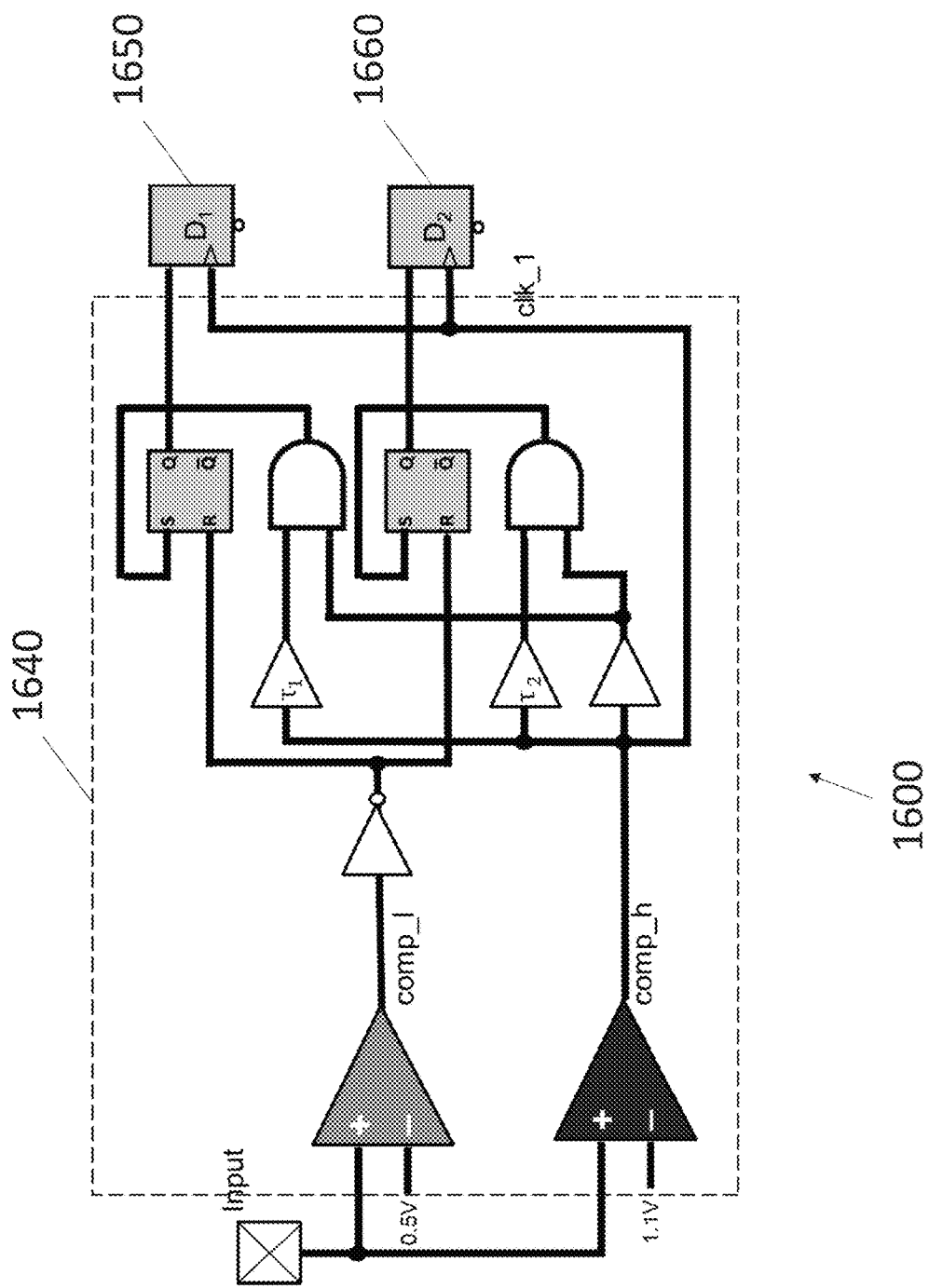
FIG. 16 is an interface circuit for detecting and communicating the symbols illustrated in FIG. 15.

FIG. 16 shows an interface circuit for detecting and communicating the start and stop symbols illustrated in FIG. 15. In this case the interface includes two memory devices, for instance a first D flip-flop 1650 and a second D flip-flop 1660. The comparator circuit 1640 is formed by a high-comparator, and a low-comparator coupled to a detector circuit. The detector circuit includes a first latch, a first AND gate and a first delay, a second latch, a second AND gate and a second delay. In this example the latches are SR latches.

The first AND gate has a first input coupled to the clock path via the first delay and a second input coupled to the clock path via a buffer. The output of the AND gate is coupled to the Set input S of the first latch. The reset of the first latch is coupled to the data path. The second AND gate has a first input coupled to the clock path via the second delay and a second input coupled to the clock path via the buffer. The output of the second AND gate is coupled to the Set input S of the second latch. The reset input R of the second latch is coupled to the data path.

The output of the first latch is coupled to the data input of the first flip-flop.

The output of the second latch is coupled to the data input of the second flip-flop.

Figure 17:
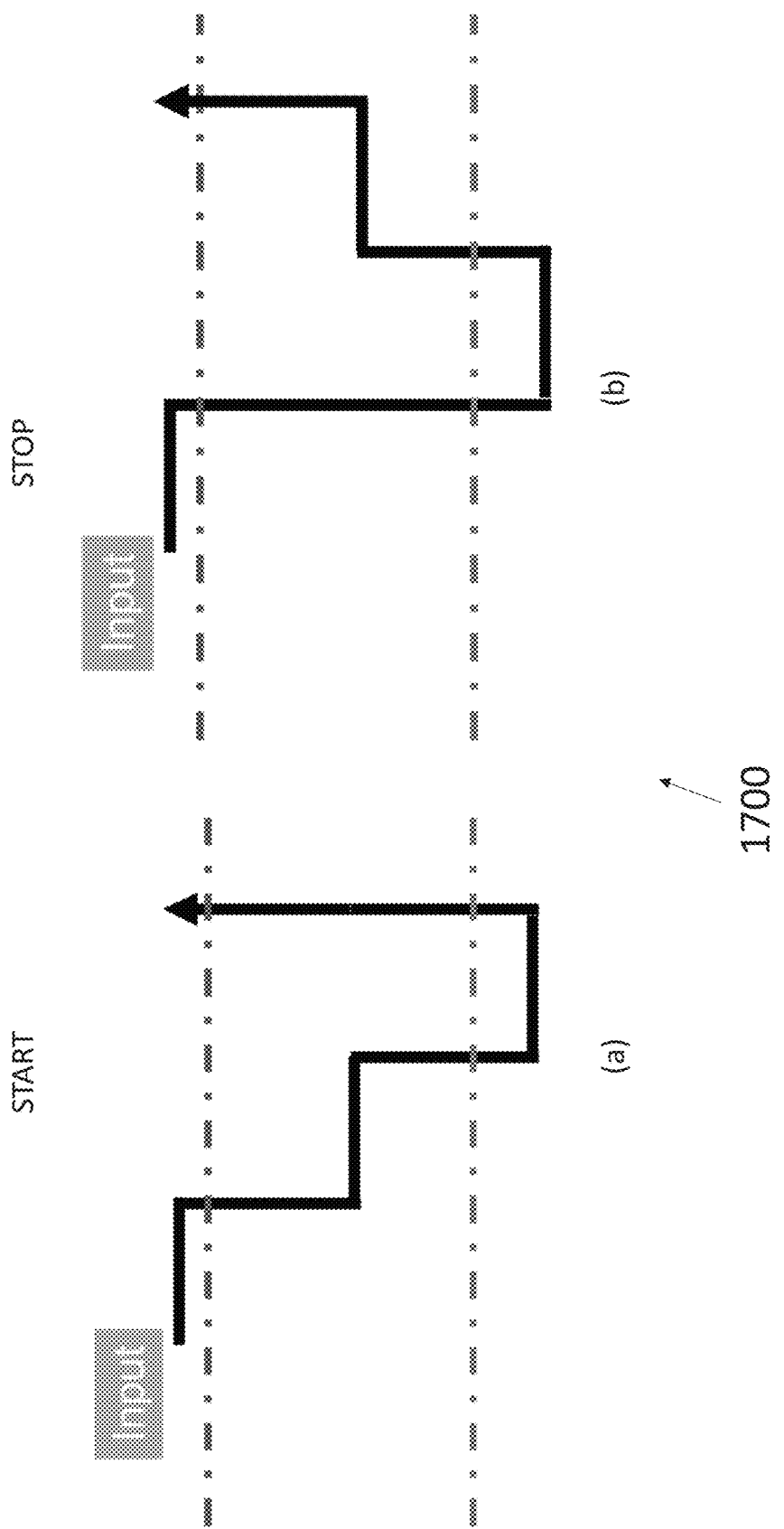
FIG. 17(a) is another waveform of a start symbol.
FIG. 17(b) is another waveform of a stop symbol.

FIG. 17 shows another example of a waveform for a start symbol (a) and a stop symbol (b). In this case the null point is greater than the first reference (null high).

Referring to FIG. 17(a), the signal transitions from the high region, to the MEDIUM region, stays in the MEDIUM region for a certain time period, then transitions to the low region, and, finally, transitions back to the high region. Referring to FIG. 17(b), the signal transitions from the high region, to the low region, then to the medium region, stays in the MEDIUM region for a certain time period, then transitions to the high region.

Figure 18:
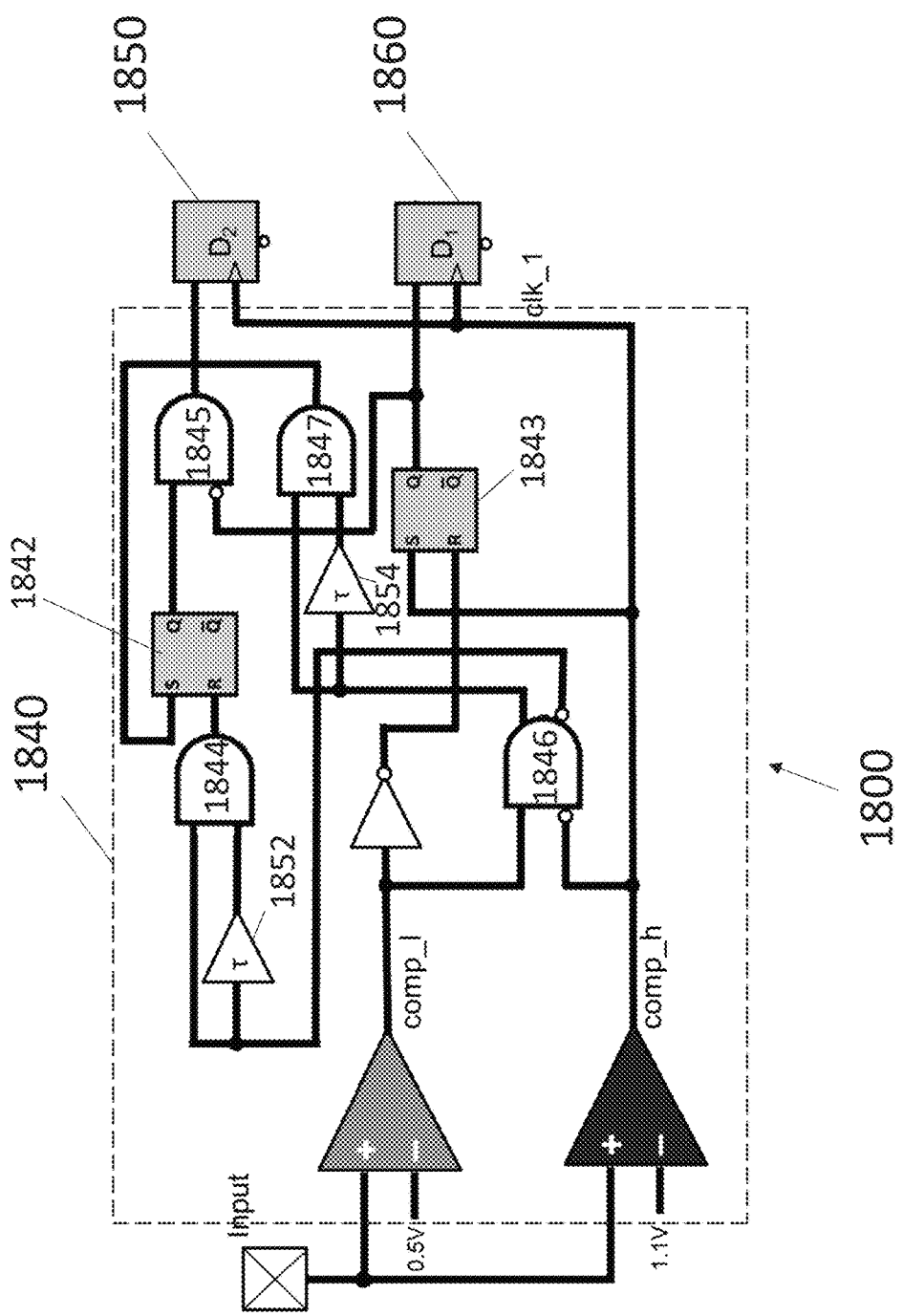
FIG. 18 is an interface circuit for detecting and communicating the symbols illustrated in FIG. 17.

FIG. 18 shows an interface circuit for detecting and communicating the symbols illustrated in FIG. 17. For example, these could be start and stop bits, or any other data. In this case the interface includes two memory devices, for instance a first D flip-flop 1850 and a second D flip-flop 1860. The comparator circuit 1840 is formed by a high-comparator, and a low-comparator coupled to a detector circuit. The detector circuit includes a first latch 1842 and a second latch 1843. In this example the latches are SR latches.

The second latch 1843 has a reset input coupled to the data path of the second latch 1843 via an inverter; and a set input coupled to the clock path.

The output of the second latch is coupled to the data input of the second flip-flop 1860.

An AND gate 1846 has a non-inverted input coupled to the data path and an inverted input coupled to the clock path. An inverted output of the logic gate 1846 is coupled to a first input of AND gate 1844 directly, and to a second input of AND gate 1844 via a delay 1852. The output of 1844 is coupled to the reset R of latch 1842.

A non-inverted output of logic gate 1846 is coupled to a first input of AND gate 1847 directly, and to a second input of AND gate 1847 via a delay 1854. The output of 1847 is coupled to the set input S of latch 1842.

The delays 1852 and 1854 need not be identical. The delays may be chosen appropriately such that the set and reset signals generated by the following AND gates 1844 and 1847 are not overlapping as this would create an illegal condition for the flip-flop 1842.

Another AND gate 1845 has a first non-inverted input coupled to the output of the first latch and an inverted input coupled to the output of the second latch 1843. The output of AND gate 1845 is coupled to the data input of the D flip-flop 1850.

Figure 19:
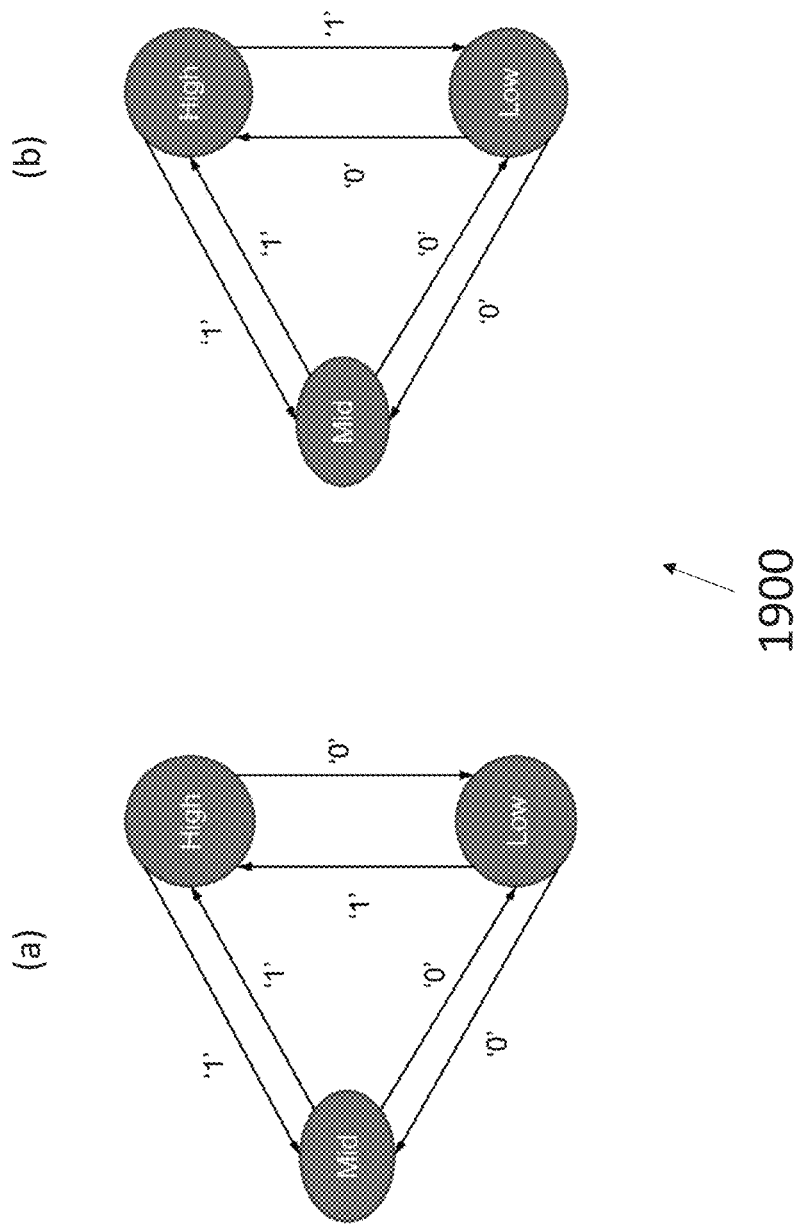
FIG. 19 is a state diagram of another three states system.

FIG. 19 shows another example a state diagram of a three states system.

In this case the null point or vertex point is the current state. FIG. 19(a) shows the case where the active transition is leaving and FIG. 19(b) shows the case where the active transition is arriving.

This approach increases the data rate since the act of leaving any state creates a transition. The polarity of the transition names, '1' and '0' is arbitrary, as long as they're assigned uniquely for the active transition.

FIG. 20(a) shows another example a state diagram of a three states system. In this case the transitions are represented by arbitrary symbols.

FIG. 20(b) shows the case where the waveform lingers for some period of time in one of the states, creating yet additional symbols. For example, if the signal started from the medium state and transitioned to the low state, an 'F' transition, the subsequent sequences could include 'F'+'C' and 'F'+'E'. But, it could also include the additional cases, where the waveform lingers for some additional time in the low state; this would be formalized as symbols 'F'+'H'+'C' and 'F'+'H'+'E'.

Figure 21:
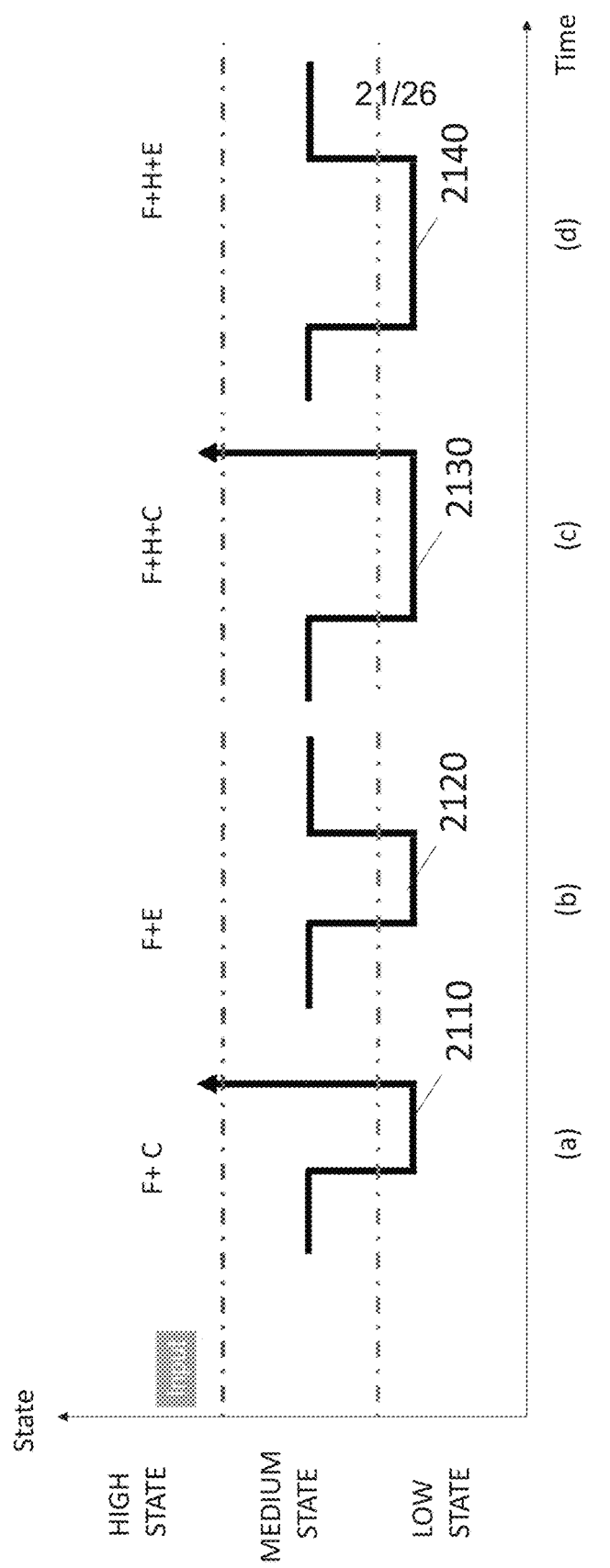
FIG. 21 is a time chart illustrating a series of input waveforms.

FIGS. 21(a), (b), (c) and (d) illustrates the input waveforms 2110, corresponding to transitions 'F'+'C', waveform 2120 corresponding to transitions 'F'+'E', waveform 2130 corresponding to transition 'F'+'H'+'C', and waveform 2140 corresponding to transition 'F'+'H'+'E' respectively.

The waveform 2130 has a longer pulse width in the low state compared with the waveform 2110. As a result, the symbol associated with the waveform 2110 is different from the symbol associated with waveform 2130.

Similarly, the waveform 2140 has a longer pulse width in the low state compared with the waveform 2120. As a result, the symbol associated with the waveform 2120 is different from the symbol associated with waveform 2140.

The method covered here can be extended to any number of states. The total number of states is equal to the number of comparators in the comparator circuit of interface, plus one.

FIG. 22 shows an example a state diagram of a four states system. FIG. 22(a) illustrates an example in which each transition caries a bit 0 or 1 which have been assigned arbitrarily. FIG. 22(b) illustrates an example with unique and arbitrary transitions labelled A to J. Each state has three transition opportunities. A transition is possible to a neighbour state. In addition it is also possible to stay in the same state.

Figure 23:
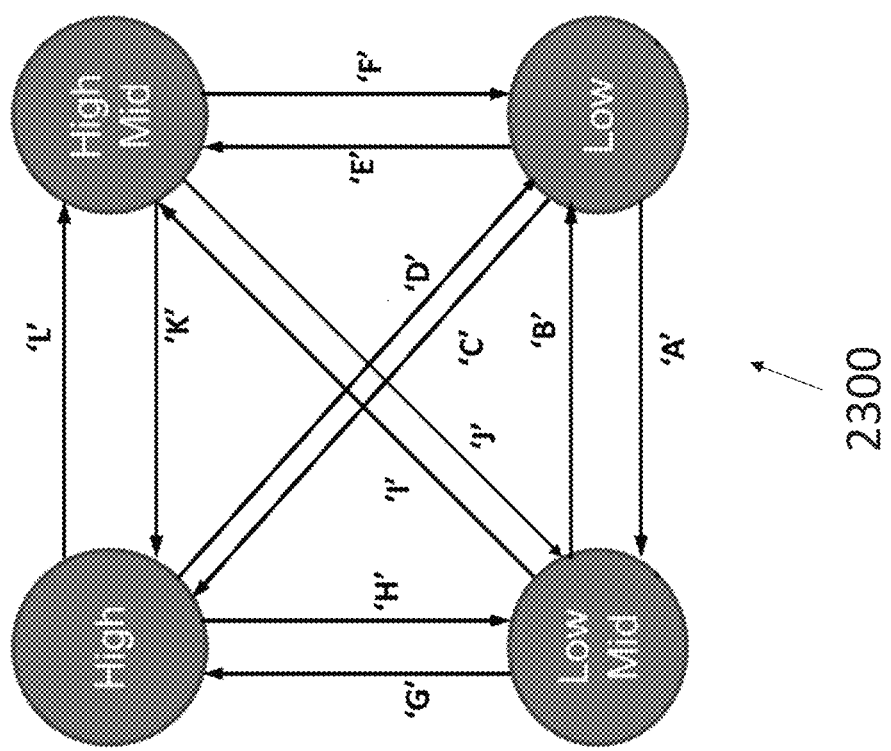
FIG. 23 is another diagram of a four states system.

FIG. 23 shows another example of a state diagram of a four states system with unique and arbitrary state definitions. Each state has three transition opportunities. In this case a transition is possible from any of the states to any of the other states, but it is not possible to stay in the same state.

FIGS. 24(a) and (b) show an example of a state diagram of a four states ADC system. In this example an operation, +0, +1, or −1, is embedded in the signal. For example, a first operation may be an increment operation +1 and a second operation may be a decrement operation −1.

FIG. 24(b) shows an example where the low state is associated with a decrement operation and where the high state is associated with an increment operation. In this way one can change the offset of the ADC by any arbitrary amount, for example by on least significant bit, LSB.

Figure 25:
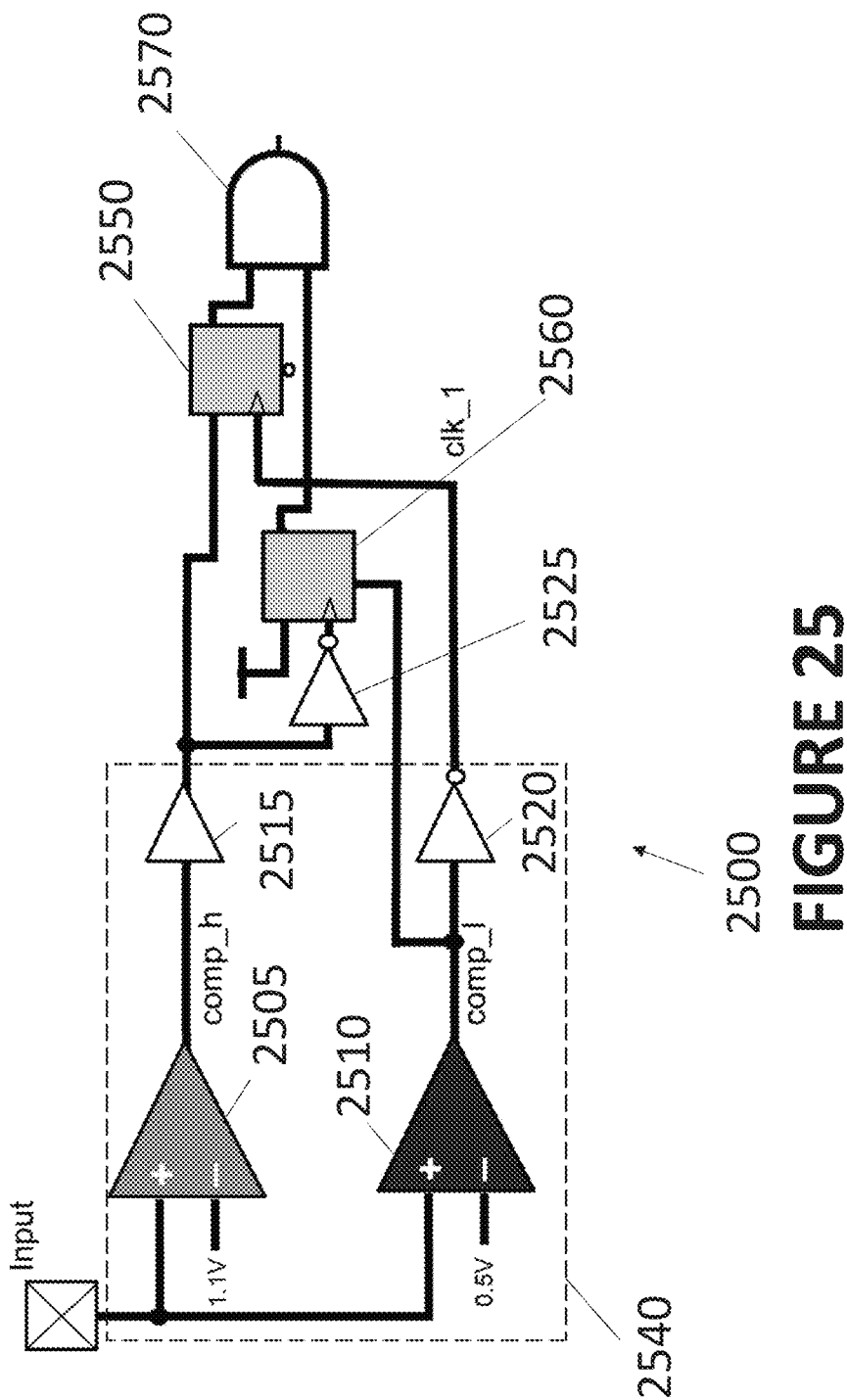
FIG. 25 is another interface circuit.

FIG. 25 shows an example of another interface. The interface of FIG. 25 may be used to communicating a signal, and or filtering an unwanted signal. In this case, the interface includes two memory devices, for instance a first D flip-flop 2550 and a second D flip-flop 2560. The comparator circuit 2540 includes a data path formed by a high-comparator 2505 coupled to a buffer 2515 and a clock path formed by a low-comparator 2510 coupled to an inverter 2520.

The first flip-flop 2550 has a data input coupled to the output of the buffer 2515 and a clock input coupled to the output of the inverter 2520. The second flip-flop 2560 has a data input coupled to a reference, a clock input coupled to the output of the buffer 2515 via an inverter 2525 and a reset input coupled to the output of the low-comparator 2510. The first and second flip-flops 2550 and 2560 are coupled to an AND gate 2570 having a first and a second input. The output of the first flip flop 2550 is coupled to the first input of the AND gate and the output of the second flip flop 2560 is coupled to the second input of the AND gate 2570.

As the input waveform transitions from a NULL to a logic 0, the output signal of the low-comparator 2510 resets the second D flip-flop 2560. If the input waveform returns to the NULL state, the AND gate 2570 transmits a logic 0. As the input waveform transitions from NULL to logic 1, the output signal of the low-comparator 2510 resets the second D flip-flop 2560. Then, the high-comparator 2505 switches, and a logic 1 is latched into the second D flip-flop 2560. On the falling edge of the low-comparator, the logic 1 is latched into the first D flip-flop 2550. Since the first D flip-flop 2550 is set to 1, the logic 1 is allowed to propagate through the AND gate 2570.

In an alternative embodiment, the clock signal, clk_1, may be derived from the high comparator 2505. In this case one can swap the high and low comparators to produce the appropriate circuit.

Figure 26:
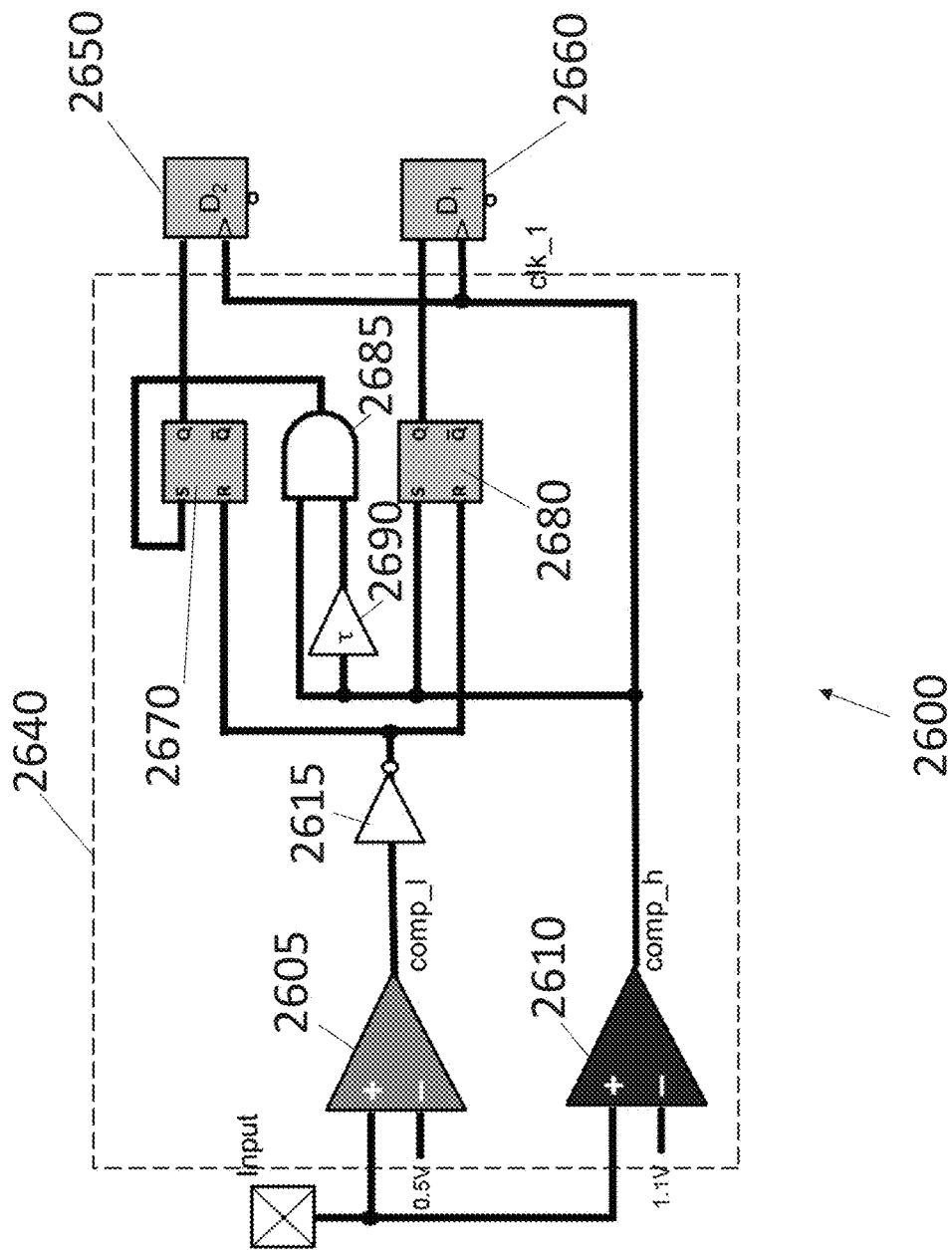
FIG. 26 is yet another interface circuit.

FIG. 26 shows an example of an interface for detecting a delay. For example, the delay may be greater in the high state than in the low state.

In this case the interface includes two memory devices, for instance a first D flip-flop 2650 and a second D flip-flop 2660. The comparator circuit 2640 is formed by a low-comparator 2605 and a high-comparator 2610 coupled to a detector circuit. The detector circuit includes a first latch 2670, a second latch 2680 an AND gate 2685 and a delay 2690. In this example, the first and second latches are SR latches.

The AND gate 2685 has a first input coupled to the output of the high-comparator 2610 and a second input coupled to output of the high-comparator 2610 via the delay 2690. The output of the AND gate 2685 is coupled to the Set input S of the first latch 2670. The reset R of the first latch is coupled to the output of the low-comparator 2605 via inverter 2615.

The reset input R of the second latch is coupled to the output of the inverter 2615, and the set S input of the second latch is coupled to the output of the high comparator 2610. The output of the first latch 2670 is coupled to the data input of the first flip-flop 2650. The output of the second latch 2680 is coupled to the data input of the second flip-flop 2660.

The invention claimed is:

1. An interface for communicating between two devices, the interface comprising
an interface input for receiving an input signal;
a data path;
a clock path;
a high comparator configured to compare the input signal to a first reference voltage to generate a data signal;
a low comparator configured to compare the input signal to a second reference voltage to generate a clock signal, wherein the first reference voltage is greater than the second reference voltage, and wherein the high comparator is configured to drive the data path with the data signal and the low comparator is configured to drive the clock path with the clock signal; and
a first register configured to register the data signal from the data path responsive to being clocked by the clock signal from the clock path.

2. The interface as claimed in claim 1, wherein one of the data path and the clock path further comprises a delay circuit.

3. The interface as claimed in claim 1, wherein the high comparator and the low comparator comprise a detector circuit adapted to detect a symbol associated with the input signal.

4. The interface as claimed in claim 3, further comprising a second register coupled to the detector circuit.

5. The interface as claimed in claim 4, wherein the detector circuit further comprises a first latch and a second latch.

6. The interface as claimed in claim 3, wherein the symbol comprises at least one of a logic state, and an instruction state.

7. A method of communicating an input signal between two devices comprising:
comparing the input signal with a first reference in a first comparator to provide a data signal based on the comparison with the first reference;
comparing the input signal with a second reference in a second comparator to provide a clock signal based on the comparison with the second reference; and
registering the data signal in a register responsive to the clock signal.

8. The method as claimed in claim 7, wherein the input signal is an analog signal and wherein the output signal is a digital signal.

9. The method as claimed in claim 7, wherein the input signal evolves between a plurality of states defined by the first reference and the second reference.

10. The method as claimed in claim 7, wherein the first reference is greater than the second reference.

11. The method as claimed in claim 7, comprising detecting whether the input signal is in at least one of a plurality of states to identify a symbol associated with the signal.

12. The method as claimed in claim 7, comprising determining a length of time the input signal remains in a given state.

13. The method as claimed in claim 11, wherein the symbol comprises at least one of a logic state and an instruction state.

14. An interface for communicating between two devices, the interface comprising
an interface input for receiving an input signal;
a data path;
a clock path;
a high comparator configured to compare the input signal to a first reference voltage to generate a clock signal;
a low comparator configured to compare the input signal to a second reference voltage to generate a data signal, wherein the first reference voltage is greater than the second reference voltage, and wherein the high comparator is configured to drive the clock path with the clock signal and the low comparator is configured to drive the data path with the data signal; and
a first register configured to register the data signal from the data path responsive to being clocked by the clock signal from the clock path.

* * * * *